USOO5548989A

United States Patent [19]
Howe et al.

[11] Patent Number: 5,548,989
[45] Date of Patent: Aug. 27, 1996

[54] AC COIL FORMER

[75] Inventors: Thomas E. Howe; David M. Taccone; Robert H. Hartmann, all of Erie, Pa.

[73] Assignee: General Electric Company, Erie, Pa.

[21] Appl. No.: 182,943

[22] Filed: Jan. 18, 1994

Related U.S. Application Data

[63] Continuation-in-part of Ser. No. 891,871, Jun. 1, 1992, abandoned.

[51] Int. Cl.$^6$ ..................................................... B21D 5/00
[52] U.S. Cl. ................................................. 72/298; 72/301
[58] Field of Search .............................. 72/301, 302, 295, 72/298, 299; 140/92.1

[56] References Cited

U.S. PATENT DOCUMENTS

| | | | |
|---|---|---|---|
| 1,495,959 | 5/1924 | Mavity | 72/295 |
| 2,451,222 | 10/1948 | James | 72/295 |
| 2,962,076 | 11/1960 | Durham | 72/298 |
| 4,450,708 | 5/1984 | King | 72/301 |
| 4,964,291 | 10/1990 | Otty | 72/195 |

FOREIGN PATENT DOCUMENTS

| | | | |
|---|---|---|---|
| 63933 | 9/1941 | Norway | 72/298 |
| 385984 | 3/1965 | Switzerland | 72/301 |

*Primary Examiner*—Daniel C. Crane
*Attorney, Agent, or Firm*—Ann M. Agosti; Marvin Snyder

[57] ABSTRACT

Apparatus for forming a form wound stator coil from a bobbin has means for clamping the straight portions of the bobbin to define the straight portions of the each leg of the coil. It also has means for bending the bobbin to predetermined radii to form arms extending from the straight portions of each leg of the coil to each nose of the coil. Means are provided for bending each arm to a predetermined radius. Means are further provided for bending the nose portions to a predetermined angle. Means for providing a drop to the arm portions of the coil relative to the stator bore are also provided. Means for forming the leads of the bobbin to a predetermined configuration are also provided. Hydraulic means for powering the apparatus and a system for controlling the hydraulic means are also disclosed.

6 Claims, 31 Drawing Sheets

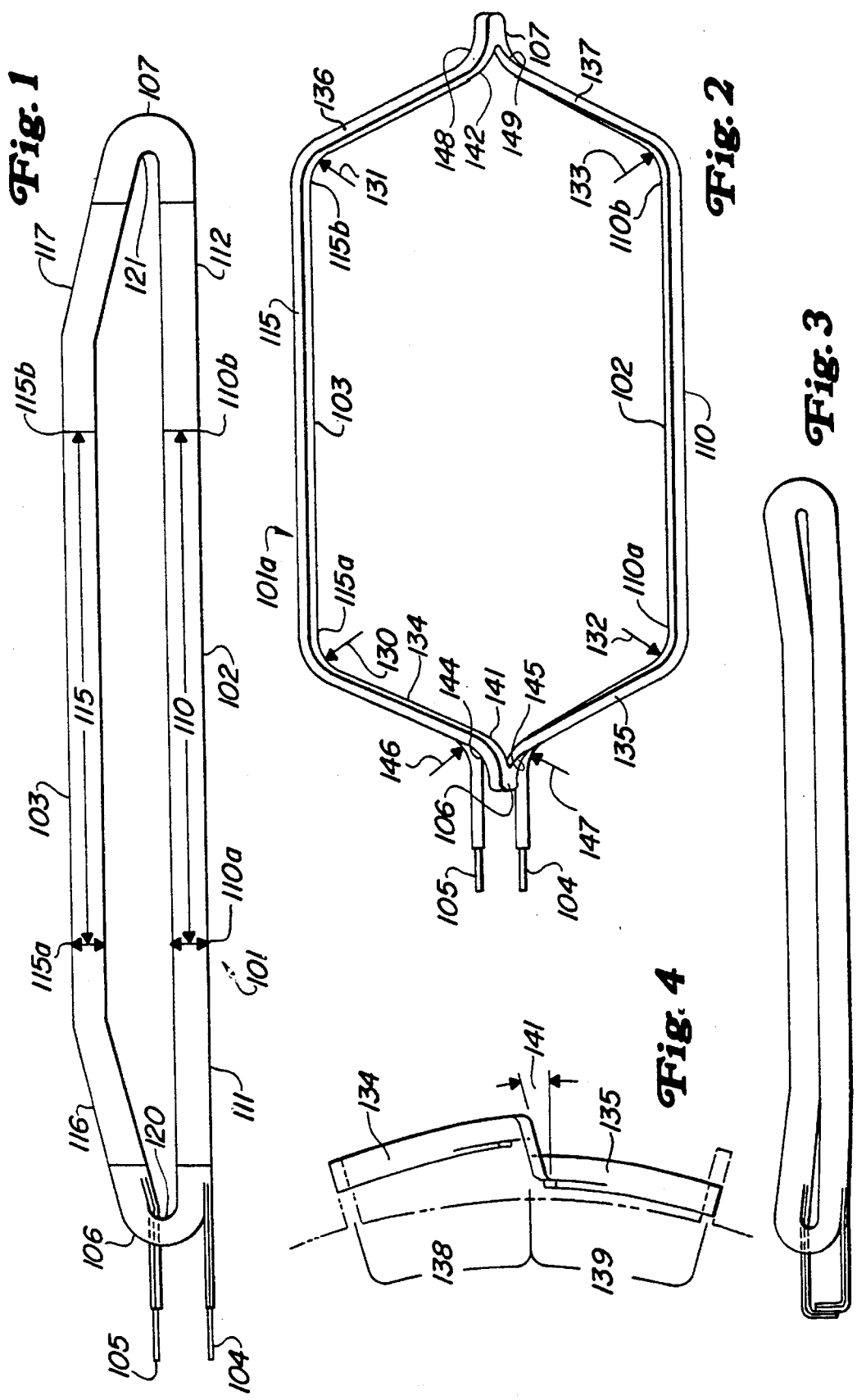

Fig. 6
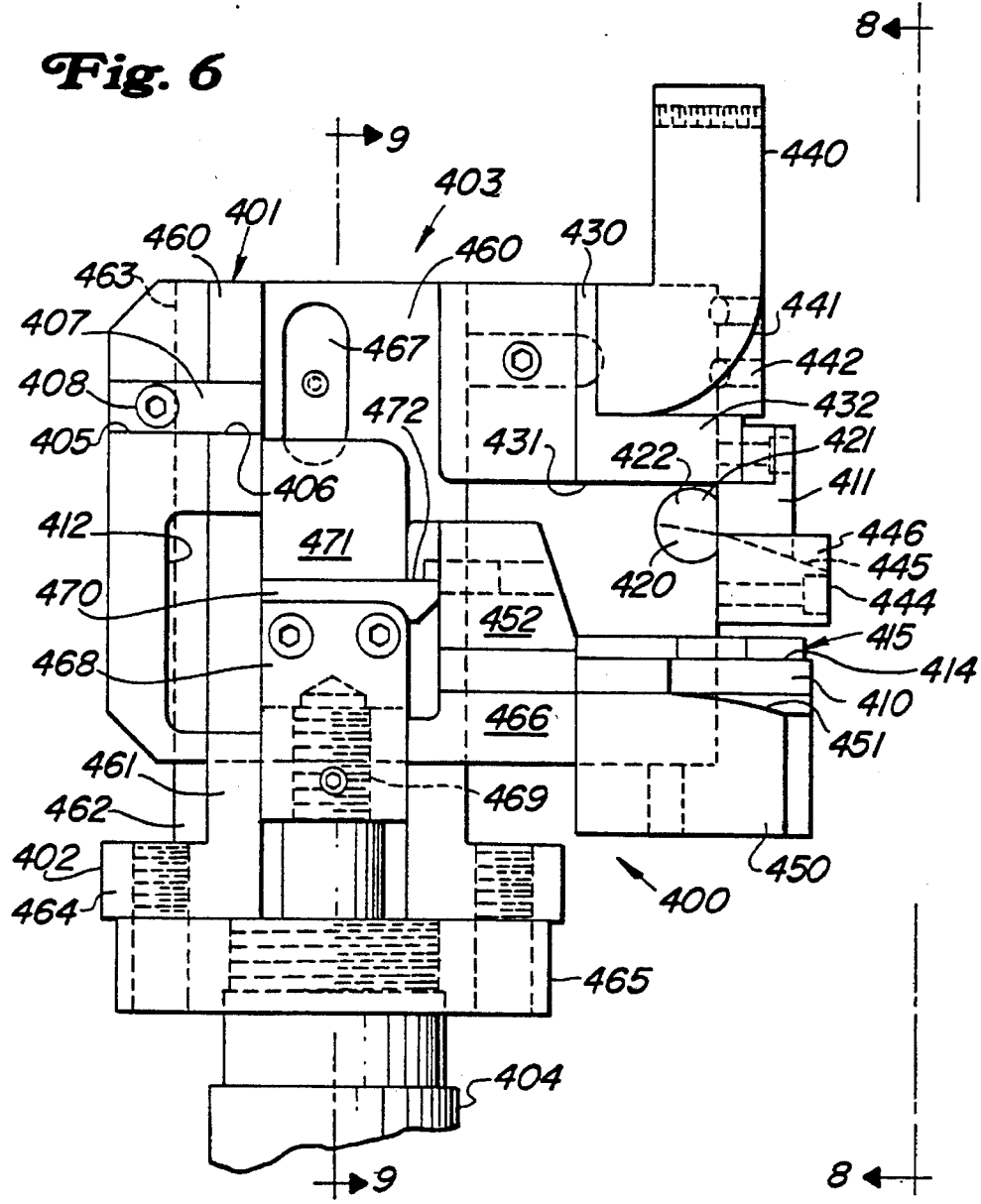
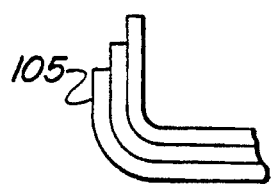
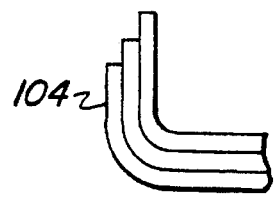

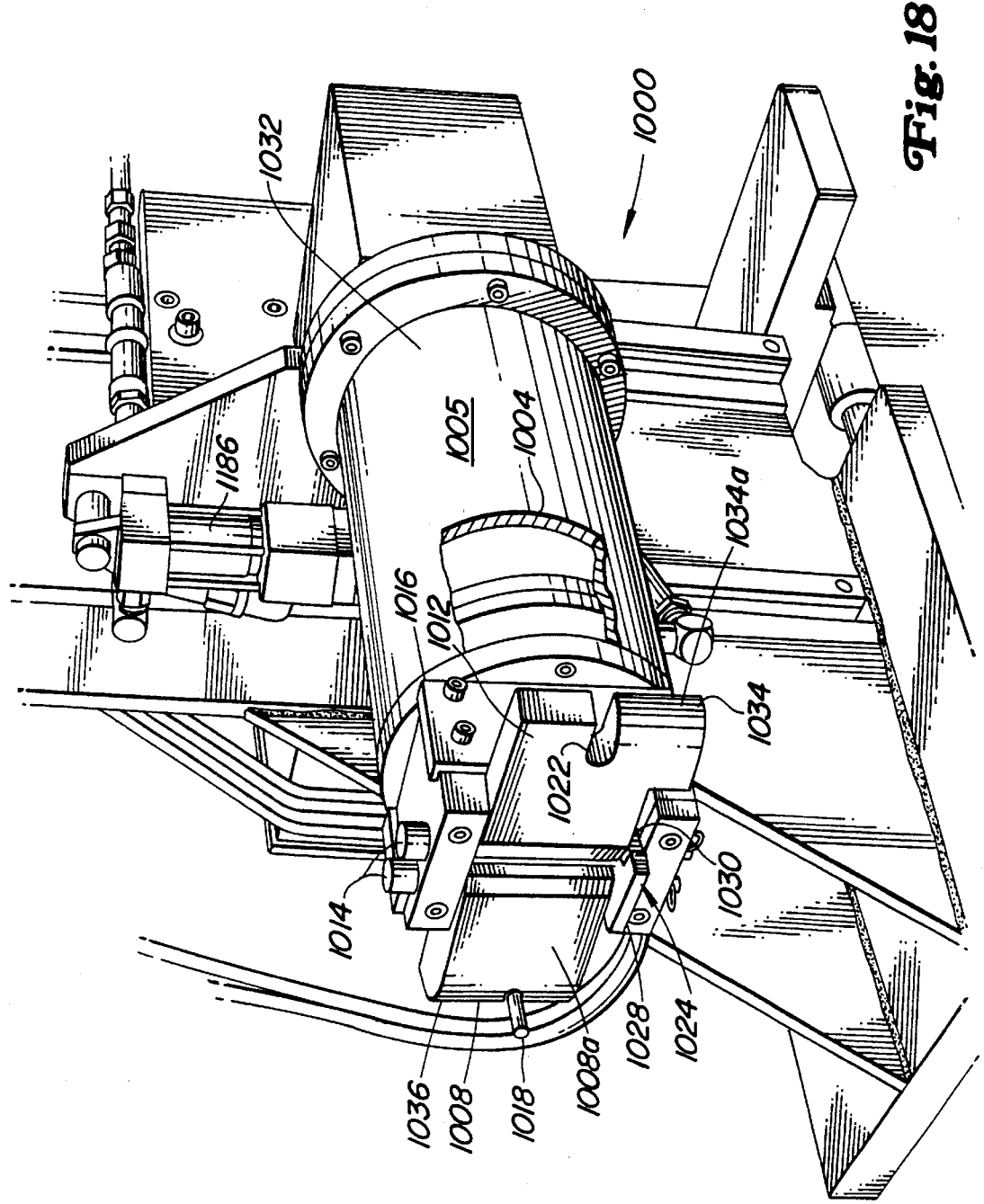

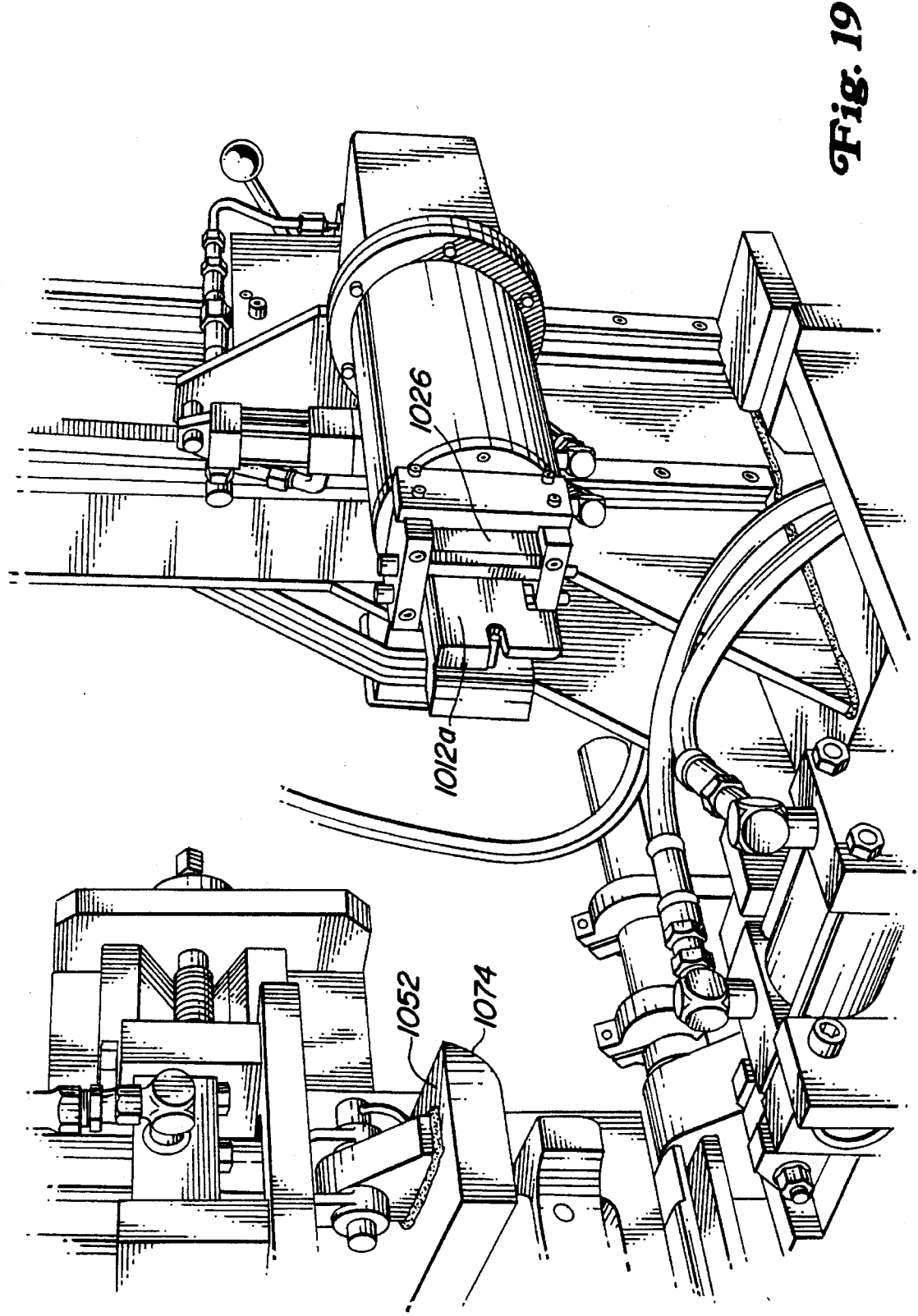

AC COIL FORMER

This is a continuation-in-part of application Ser. No. 07/891,871 filed Jun. 1, 1992, now abandoned.

A portion of the disclosure of this patent document contains material which is subject to copyright protection. The Copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to a method and apparatus for producing form wound stator coils from a predesigned bobbin.

BACKGROUND PRIOR ART PROBLEM

Form wound stator coils are made from "bobbins", which consist of a number of turns of copper wire which may be in a prescribed form which relates to the final desired configuration of the stator coil.

Previously, making form wound stator coils was a labor intensive operation. Bobbins of insulated copper wire were formed to an approximate coil shape on crude manually run machines and then hammered into the desired shape. One disadvantage of that process was that repeatedly hammering the bobbin resulted in some degradation of the properties of the copper wire and turn insulation. Another disadvantage was that it took as long as 15 minutes to shape the bobbin into the prescribed shape of the stator coil. Further, it was difficult to produce coils within close tolerances, and poorly shaped coils are difficult to insert into the stator coil and often cause damage which results in future motor failures. Coil forming machines are known which pivot about a center axis equivalent to a center axis of the stator coil to stretch bobbins. However, such known machines typically require manual control of grippers and are not generally adapted to form leads of the bobbins. In addition, such machines typically do not have rotational nose end clamps to properly form nose ends of bobbins.

Attempts have been made to construct apparatus to shape bobbins in desired coil configurations. Prior to this invention, no such apparatus has been available to completely configure a bobbin to the desired stator coil configuration.

Another disadvantage with prior art methods, particularly when seeking to shape bobbins for smaller stators, is the difficulty in shaping bobbins having smaller dimensions. As the number of shaping elements in a particular bobbin forming assembly increases, the difficulty in attaching the elements to the smaller bobbin, so that the smaller bobbin is properly shaped, also increases.

SUMMARY OF THE INVENTION

It is an object of this invention to create an apparatus which is capable of completely forming a form wound stator coil from a bobbin.

It is another object of this invention to create an apparatus which is capable of completely forming form wound stator coils having a variety of dimensions with a minimal change in tooling.

It is another object of this invention to create an apparatus which is capable of completely forming a form wound stator coil in such a manner which minimizes or eliminates degradation or work hardening of the copper wire in the bobbin.

It is another object of this invention to create an apparatus which is capable of mass producing form wound stator coils having little, if any, meaningful variation in tolerances, and to produce such coils at the rate of about one minute per coil or less.

It is a further object of the present invention to create an apparatus which is capable of mass producing form wound stator coils and which is particularly adapted to shape bobbins for smaller sized stators.

In one form of the invention, apparatus is provided for forming a form wound stator coil from a bobbin. The bobbin from which the form wound stator coil is formed has a lower leg including a straight length portion and two nose end arms, and an upper leg including an upper leg straight length portion and two nose end arms, a lead end nose defining a lead end inner nose radius, an opposite lead end nose defining an opposite lead end inner nose radius, and leads.

The apparatus includes lower leg clamping means for clamping the lower leg of the bobbin to maintain the lower leg straight length arm portion substantially in its original shape and for forming a radius of predetermined dimensions between the straight length portion and the lower leg nose end arms, and lower leg clamp positioning means for initially positioning the lower leg clamping means on at least the opposite ends of the lower leg straight length arm portion.

The apparatus also includes upper leg clamping means for clamping the upper leg of the bobbin to maintain the upper leg straight length arm substantially in its original shape and for forming a radius of predetermined dimensions between the straight length portion and the upper leg nose end arms, and upper leg clamp positioning means for initially positioning the upper leg clamping means on at least the opposite ends of the upper leg straight length arm.

The apparatus also includes pivoting means for pivoting the lower leg clamping means and pivoting means for pivoting the upper leg clamping means, both pivoting means being pivoted about an axis equivalent to the center axis of the stator core into which the finished coil will be inserted.

Lead end clamping means are provided for securing the lead end nose, and opposite lead end clamping means are provided for securing the opposite lead end nose in a fixed position.

First and second positioning means are provided for positioning the lead end and opposite lead end clamping means with respect to the dimensions of the bobbin. Further, first and second pressure means are provided for selectively applying pressure against the first and second positioning means, and the pressure is directed generally outwardly from the center of the apparatus.

Operation means are provided for pivoting the lower leg clamping means to a first predetermined angle and for pivoting the upper leg clamping means to a second predetermined angle and for activating the first and second pressure means to apply a predetermined amount of pressure and flow so that the lower leg clamping means and the upper leg clamping means reach their respective predetermined angles substantially simultaneously.

Encoder means are also provided for providing feedback to control means of the positions of the lower leg clamping means, the lower leg clamp positioning means, the upper leg clamping means, the upper leg clamp positioning means, the pivoting means, the lead end clamping means, the opposite lead end clamping means, the first and second positioning means, and for providing feedback to control means of the status of the operation means.

Position indication means are provided for visually depicting the lateral spacing between each of the lower leg clamping means and between each of the upper leg clamping means for setting those clamps to a distance equal to the straight length portion of each leg of the bobbin. Control means are provided for controlling the operation means to position and move the lower leg clamping means, the lower leg clamp positioning means, the upper leg clamping means, the upper leg clamp positioning means, the lead end clamping means, the opposite lead end clamping means, and the first and second positioning means in a predetermined manner so that the clamps can be initially positioned to receive a bobbin having predetermined dimensions, and so that the clamps can close to secure the bobbin, and so that the clamps can be moved and rotated to produce a formed coil having predetermined dimensions.

Means are also provided for securing individual strands of wire in the lead end nose from becoming misaligned with respect to one another, and means are also provided for securing individual strands of wire in the opposite lead end nose from becoming misaligned with respect to one another.

Arcing means are also provided for arcing the arms of the upper and lower legs to a predetermined radius. Additional means are provided for configuring the leads to a predetermined configuration.

In another aspect of this invention, a method is provided for forming a form wound stator coil from a bobbin. The lower and upper legs of the bobbin are clamped proximate to the opposite ends of their straight length portions to maintain the straight length portions to predetermined dimensions.

The lead end nose, the leads, and the opposite lead end nose are also clamped and maintained in a free floating relationship against an applied pressure of from about 10 pounds per square inch to about 25 pounds per square inch, or preferably about 15 pounds per square inch. As will be understood by those skilled in the art, the pressure can be varied, depending on the forces applied to the bobbin during core forming operation. Ideally, the pressure applied to the nose clamps is sufficient to cause the nose clamps to smoothly move inward toward each other as the legs are rotated outward from one another.

The lower and upper legs are rotated outward to a predetermined angular relationship from one another about an axis equivalent to the center axis of the stator core into which the finished coil will be inserted. At approximately the same time a radius of predetermined dimensions is formed between the straight length portion and the lower leg nose end arms, and radii are formed between the lead end and opposite lead end noses and the upper and lower nose end arms proximate to said noses. Those radii are formed by radial tools disposed on the outside ends of the clamps which maintain the straight length portions of the coil.

The noses are rotated to a predetermined angle, and the noses are raised to the desired "drop" (the angular position of the noses relative to a line tangent to the teeth of the stator core which permits sufficient clearance for the rotor to be inserted in the stator core after the coils are inserted into the slots of the stator core).

In preferred embodiments of the method, radii are formed on the upper and lower nose end arms. Further the leads are formed to a predetermined configuration. In addition, the lower and upper legs are rotated outward to a predetermined angular relationship from one another in a smooth, continuous motion to minimize degradation of the copper wire in the bobbin.

In another aspect of this invention, a control system is provided for operating an apparatus for producing a form wound stator coil having a predetermined configuration from a bobbin having a predetermined configuration and dimensions. The control system is provided with means for inputting bobbin and coil dimension data and clamp position data. It also comprises operator controlled means for selectively generating apparatus operating command signals, such as signals for positioning the means operable on the bobbin to receive a bobbin, and signals for causing the means operable on the bobbin to operate on the bobbin to form coils and for causing the means operable on the bobbin to release the formed coil to permit its removal from the apparatus. The control system is provided with means for interpreting feedback signals from the encoder means. It also includes a variable program control means for receiving and interpreting bobbin and coil dimension data, encoder input signals and operating command signals. The control system further includes means for generating commands in a preselected sequence to the operation means responsive to the variable program control means to actuate the operation means to position the means operable on the bobbin to receive the bobbin, to actuate the means operable on the bobbin to form the coil to predetermined dimensions, and to actuate the means operable on the bobbin to permit removal of the formed coil from the apparatus.

The present invention is a very significant advance over any prior art known to applicants. With the present invention, one operator can generate a coil from a bobbin in less than a minute, and ideally in 45 seconds or less. Prior methods took 15 minutes to perform the same operation. Further, the coils formed by the present invention are uniform and have much closer tolerances than was possible using prior apparatus. In addition, the copper wire in the coils formed by the present invention is not subject to nearly as much mechanical degradation as in the prior art method, where the bobbin had to be hammered—a significant amount in some cases—to form a coil, resulting in mechanical degradation of the properties of the copper wire and also in some damage to the wire insulation.

The present invention will be better understood and its various advantages will be more fully appreciated from the following description taken in conjunction with the accompanying drawings.

THE DRAWINGS

FIG. 1 is a sketch of a bobbin used in the present invention;

FIG. 2 is a sketch of a finished form wound stator coil made from the bobbin in FIG. 1;

FIG. 3 is a side view of the finished form wound stator coil shown in FIG. 2;

FIG. 4 is an end view of the finished form wound stator coil shown in FIG. 2;

FIG. 6 is a front view of the back section of the head block of the lead end nose clamp showing the cylinder rod in the extended position and also showing how the leads of the bobbin are bent by the removable tools used in that clamp;

FIGS. 17A through 17G are schematic drawings of a hydraulic system which may operate the apparatus shown in FIGS. 5-16;

FIG. 18 is a perspective view of an alternate embodiment of the nose end clamping assembly;

FIG. 19 is a partial perspective view of an alternate embodiment of the nose end clamping assembly and upper and lower leg clamps of the coil forming apparatus of the present invention;

DETAILED DESCRIPTION

Figure 5:
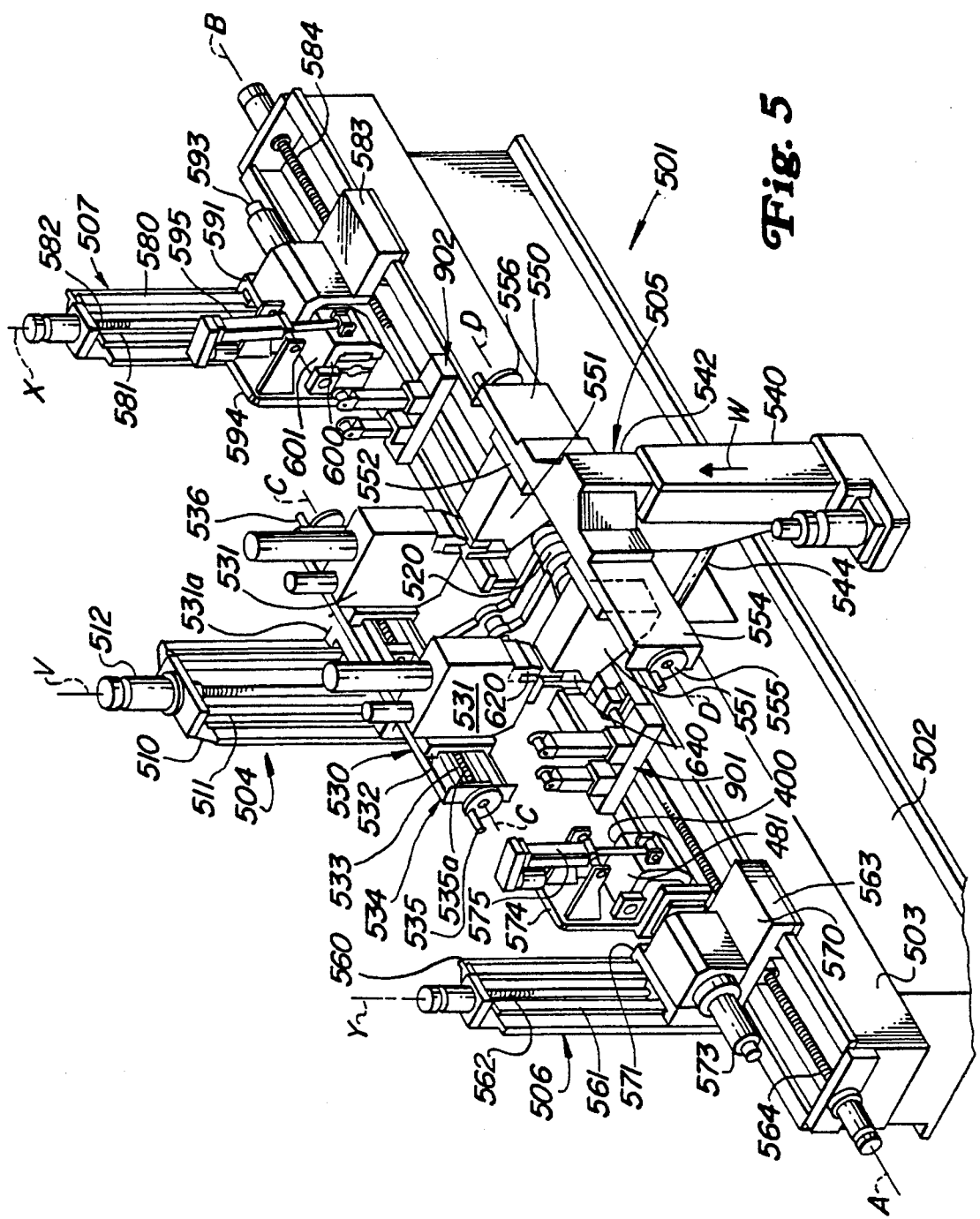
FIG. 5 is a drawing showing an elevational view of the major components of one embodiment of an apparatus of the present invention.

The present invention converts bobbins into form wound stator coils. The dimensions of the bobbin are a function of the final designed geometry of the form wound stator coils. A bobbin used in the present invention is schematically shown in FIG. 1. Bobbin 101 comprises at least one turn of insulated copper wire which has been wound in the configuration shown in FIG. 1. Bobbin 101 has a lower leg 102, an upper leg 103, leads 104 and 105, a lead end nose 106, and an opposite lead end nose 107. Lower leg 102 includes a coil straight length portion 110, which extends between lines 110a and 110b which is equal in length to the total straight length of the finished coil, and nose end arms 111 and 112. Upper leg 103 includes a coil straight length portion 115, which extends between lines 115a and 115b and which is equal in length to the total straight length of the finished coil, and nose end arms 116 and 117. Lead end nose 106 and nose end arms 111, 116 form an interior radius 120. Similarly, opposite lead end nose 107 and nose end arms 117, 112 form an interior radius 121.

As will be explained in more detail below, bobbin 101 is placed in clamps in coil forming apparatus 501 shown in FIG. 5. The coil forming apparatus of this invention spreads the bobbin to form the finished form stator coil having the configuration shown in FIGS. 2–4.

FIG. 2 is a sketch of a coil 101a formed by the apparatus of this invention. FIG. 3 is a side view of the coil, and FIG. 4 is and end view. The coil 101a has an outer nose radii 144 formed at the lead nose end 106 and nose end arm 134 and outer nose radii 145 formed at opposite lead end nose 107 and nose end arm 135. The coil 101a also has outer nose radii 146 and 147 along the transition between leads 105 and 104 and lead end nose 106. The straight portion 115 of upper arm 103 and the nose end arms 134, 136 form radii 130 and 132 respectively. The straight portion 110 of lower arm 102 and the nose end arms 134, 137 form radii 132 and 133 respectively. The nose end 106 and nose end arms 134, 135 form interior radius 141, and the opposite nose end 107 and nose end arms 136, 137 form interior radius 142. Also, nose arms 134, 135, 136 and 137 to form arcs 138 and 139, as can be seen by FIG. 4, which is an end view of the coil 101a.

As shown in FIG. 5, the major components of coil forming apparatus 501 include base 502, base drive housing 503, upper bobbin leg clamp assembly 504, lower bobbin leg clamp assembly 505, lead end nose clamp assembly 506, and opposite lead end nose clamp assembly 507. As is discussed below, upper and lower leg clamps 531 and 551, respectively, spread legs 102 and 103 of bobbin 101 (FIG. 4).

Upper bobbin leg clamp assembly 504 includes tower frame 510 which is provided with tracks 511 and drive shaft means 512. Tower frame 510 is pivotally connected to pivot 520, and tower frame 510 may be pivoted about pivot 520 by hydraulic drive means or other suitable means which are well known to those skilled in the art. Position encoding means, not shown but known to those skilled in the art, are disposed to indicate the angle to which tower frame has been rotated about pivot 520.

Tower drive unit 530 is mounted in driving relationship with drive shaft means 512 and includes slot units 531a in locked sliding engagement with tracks 511. Tower drive unit 530 thus may be moved up and down tower frame 510 along the "V" axis, which runs through drive shaft 512. Position encoding means, not shown but known to those skilled in the art, are disposed to indicate the position of tower drive unit 530 on tower frame 510.

Tower drive unit 530 is provided with upper leg clamps 531 which are slidably interlocked by track engaging units 532 to tracks 533 on transverse drive assembly 534 which moves upper leg clamps along axis "C", which is transverse to the "V" axis of tower frame 510. Transverse drive assembly includes one or more screw drives or other suitable means for moving clamps 531 to their desired position. In the embodiment shown, clamps 531 move simultaneously outward from center or inward toward center by manually turning either handle 535 or 536, which respectively drive screw 535a which is half right handed and half left handed thread. A position indicator (not shown) is disposed on the assembly to indicate the position of each of the clamps 531 on transverse drive assembly 534. That position is input into the control system of the invention. Alternatively, position encoding means may be used to automatically feed the position to the control means.

Figure 12:
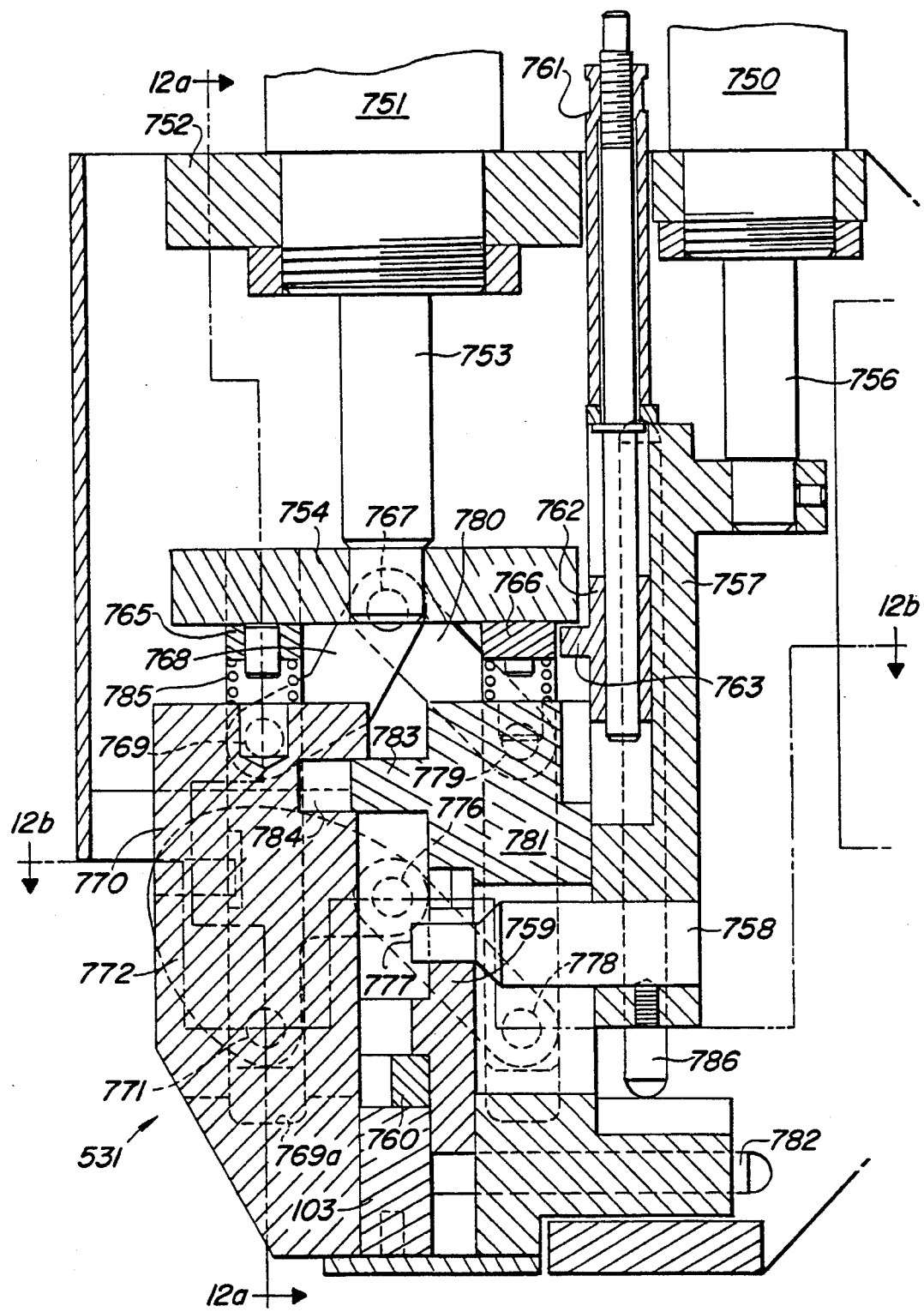
FIG. 12 is a side cross sectional view of the upper leg clamp assembly.
Figure 12A:
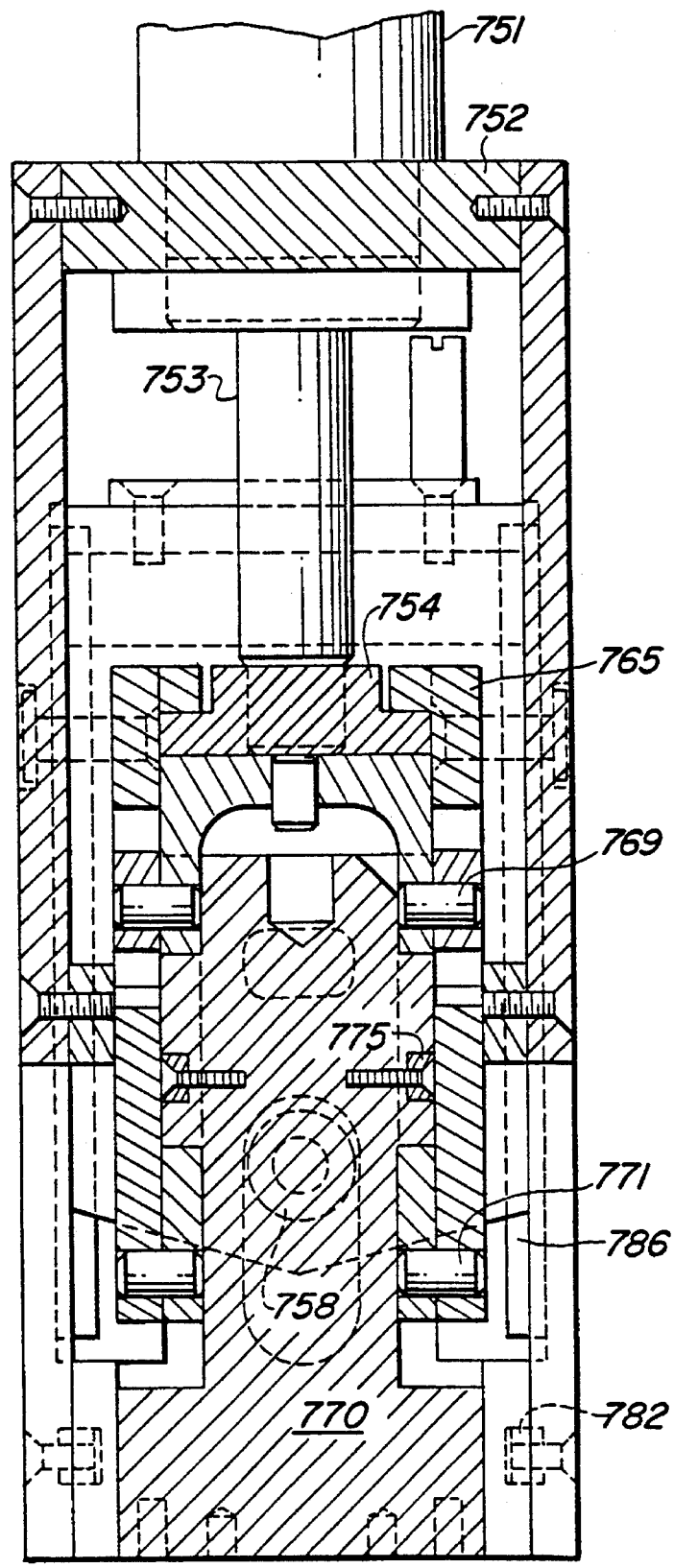
FIG. 12A is a front cross sectional view taken along line C—C of FIG. 12.
Figure 12B:
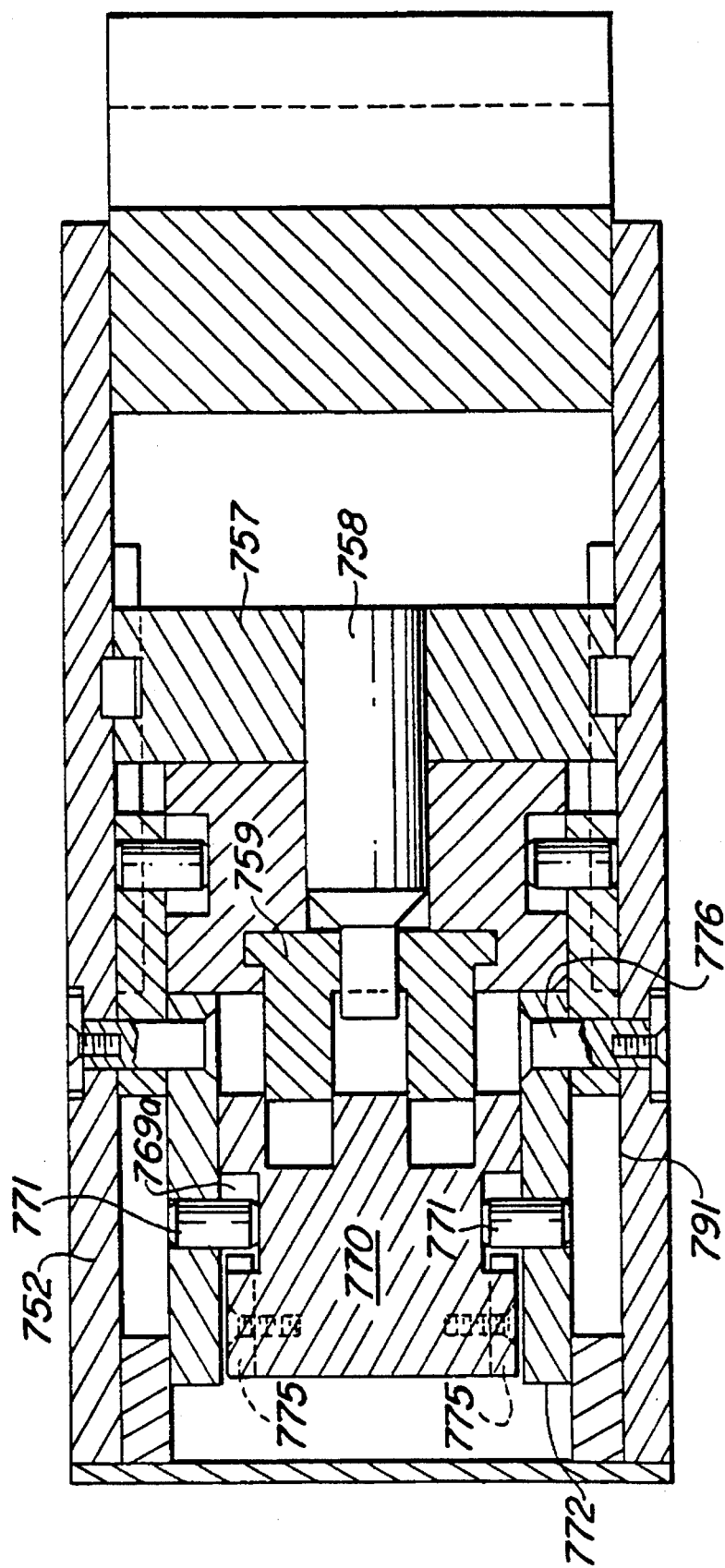
FIG. 12B is a top view taken along line A—A of FIG. 12.

Upper leg clamps 531 are four sided clamps which are adapted to engage upper leg 103 of bobbin 101. As is shown in FIG. 12, which is a side view of the upper leg clamp assembly 531 and associated apparatus, upper leg clamp assembly 531 includes two hydraulic cylinders; front cylinder 751 and back cylinder 750. Front cylinder 751 is mounted on frame 752. Front cylinder rod 753 is connected to plate 754, which is connected to generally U-shaped brackets 765 which is better viewed on FIG. 12A and 766, which is shown in FIG. 12. Frame pin 767 is connected to link 768, which in turn is connected through pin 769 to U-bracket 765. U-bracket 765 slides in a slot 769a in shutter 770. Pin 771 is also connected at the lower end of U-bracket 765. Pin 771 is also connected to link 772. Link 772 and link 768 impart a rotational to linear motion, so that when rod 753 of cylinder 751 is retracted, shutter 770 is lifted forward and upward about the links and thus opens to permit insertion or removal of upper leg 103 of bobbin 101. As is shown in FIG. 12B, retaining keys 775 are disposed in shutter 770 to enable U-bracket 765 to pull shutter 770 into its retracted or open position.

Referring to FIG. 12, link 772 is also connected to frame pin 776, which is also connected to link 777. Link 777 rotates about frame pin 776, and is also connected to pin 778. Pin 778 is located in back U-frame 766. Pin 779 is also located in U-frame 766. Link 780 is connected to pin 779 and to pin 767. Rear jaw 781 is in sliding relation on key 786.

When rod 753 is extended, it closes the shutter 770 by imparting a rotational to linear motion through U-frame 765 which pivots about links 768 and 772 which close shutter 770. When rod 753 is extended, links 780 and 777 impart linear motion to rear jaw 781, which has an integral key 783, which mates with slot 784 in shutter 770 to lock shutter 770 and jaw 781 together.

Die springs 785 disposed between U-frames 765 and 766 and shutter 770 and rear jaws 781 aid in the unclamping cycle when the shutter 770 is opened (i.e., when rod 753 is retracting).

Back cylinder 750 has rod 756, which is connected to slide 757, which is guided by keys 786. Pin 758 is connected to slide 757 and extends frontward and is connected at its opposite end to top jaw 759 on which clamping tool 760 is removably secured. As shown in FIG. 12, clamping tool 760 is generally L shaped, having a radially shaped inner surface. Tool 760 may be configured to match the dimensions of the bobbin 101 placed in the clamp. Thus, by forming a number of different sized tool 760 parts, upper clamp 531 may engage and clamp different sized bobbins. Cylinder rod 756 moves tool 760 up and down. When the bobbin is placed in the clamp, tool 760 is in the up position, and when the clamp closes, tool 760 is forced down on the upper arm 115 of the bobbin 101 to secure it in the clamp.

Adjustable pin 761 is connected to stop block 762, which has flange 763 disposed to engage plate 754 to stop relative movement between the upper and lower parts of clamp 531.

Referring to FIG. 5, lower bobbin leg clamp assembly 505 includes support frame 540 and drive shaft 542 which is driven by motor or hydraulic means (not shown) which are well known to those skilled in the art. Drive frame 542 is driven along axis "W" in support frame 540. Support frame 540 is pivotally connected to pivot 520, and support frame 540 may be pivoted about pivot 520 by hydraulic drive means, such as hydraulic drive shaft 544 or other suitable means which are well known to those skilled in the art. Position encoding means, not shown but known to those skilled in the art, are disposed to indicate the angular position of support frame 540 as it is rotated on pivot 520.

Drive frame 542 is provided with lower leg clamps 551 which are slidably interlocked by slot units 552 to tracks (not shown) on transverse drive assembly 554 which moves upper leg clamps along the "D" axis, which is transverse to the "W" axis of support frame 540. Transverse drive assembly 554 is secured to drive frame 542. Position encoding means, not shown but known to those skilled in the art, are disposed to indicate the position of transverse drive assembly along the "W" axis of support frame 542. Transverse drive assembly includes a screw drive or other suitable means for moving clamps 551 to their desired position. In the embodiment shown, clamps 551 are moved independently and manually by turning drive handles 555 or 556. A position indicator (not shown) is disposed on the assembly to indicate the position of each of the clamps 551 on transverse drive assembly 554. That position is input into the control system of the invention. Alternatively, position encoding means may be used to automatically feed the position to the control means.

Figure 13:
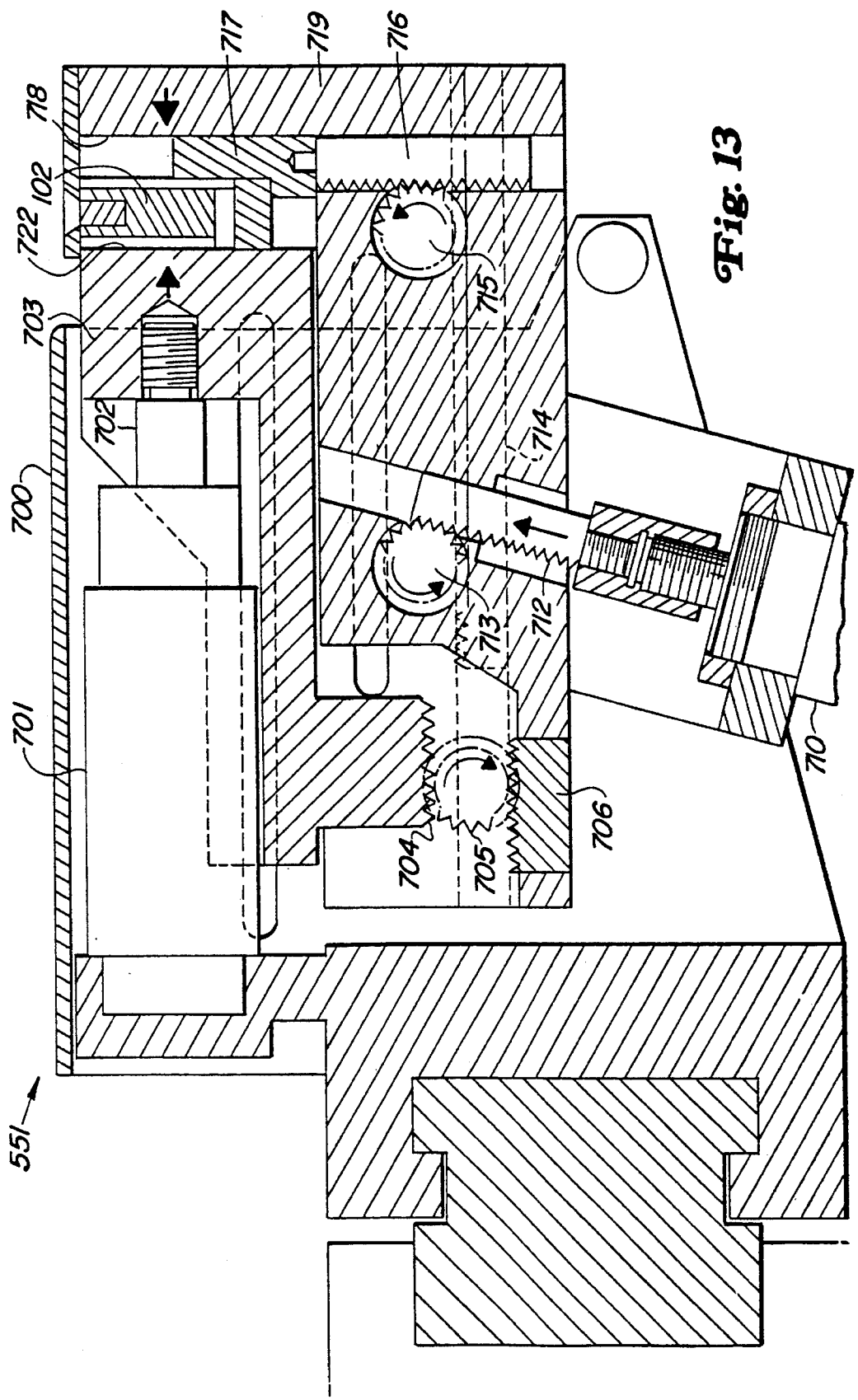
FIG. 13 is a cross sectional side view of lower leg clamp 551.

Lower leg clamps 551 are four sided clamps which are adapted to engage lower leg 102 of bobbin 101. FIG. 13 is a cross sectional side view of lower leg clamp 551 and associated parts. Lower leg clamps include chassis 700, which houses hydraulic cylinder 701 having cylinder rod or plunger 702 in driving connection with upper jaw 703. On the lower part of jaw 703 is a gear 704 that drives pinion 705. Pinion 705 is geared to lower jaw 706. Thus, when plunger 702 moves, upper and lower jaws move toward or away from each other.

Figure 14:
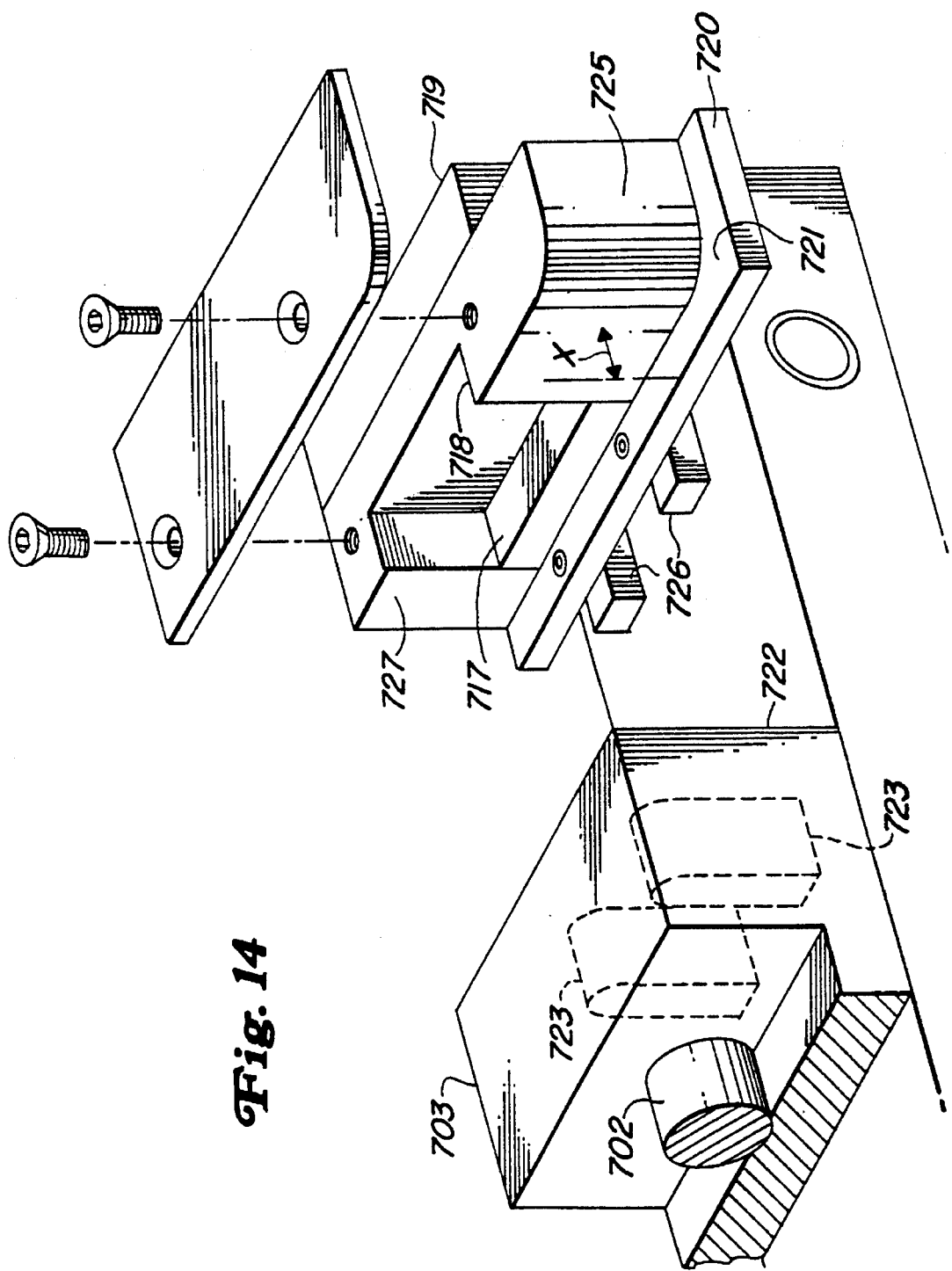
FIG. 14 is a partially exploded elevational view of lower leg clamp 551.

Hydraulic cylinder 710 is secured to the lower jaw 706 and moves with the lower jaw. Cylinder 710 has rod 711 connected to rack 712 which drives pinion 713. Pinion 713 drives rod 714 which in turn drives pinion 715 which drives rod 716 which drives movable front jaw 717 into position to secure the lower leg 102 of bobbin 101. As is shown in FIG. 14, sliding jaw 717 slides up and down in slot 718 defined by front jaw 719. The end of front jaw 719 at the side closest to the nearest nose is provided with cylindrically shaped radius block 725 which is adapted to form a radius on the lower bobbin leg near the closest nose to form the arms on the lower bobbin leg, as can be appreciated from FIGS. 1 and 2. When placed in the clamp, lower leg 102 of bobbin 101 sits the upper surface 721 of shelf 720, which is secured to guides 726 of jaw 717. The "x" dimension of shelf 720 as shown in FIG. 14 is slightly less than the thickness of the wire in the bobbin so that the front face 722 of upper jaw 703 clamps the bobbin against the opposing face 727 of jaw 719 when the clamp is closed. Front face 722 of jaw 703 is provided with slots 723 which receive guides 726. Shelf 721 and radius forming block 725 can be changed, depending on the dimensions of the bobbin and the desired dimensions of the stator coil formed by the apparatus 501.

Referring back to FIG. 5, lead end nose clamp assembly 506 includes tower frame 560 which is provided with tracks 561 and drive shaft means 562. Tower frame 560 includes a track riding unit 563 for moving tower frame along the "A" axis of the base drive screw 564 in the base drive housing. Track riding unit 563 is thus mounted in driving relationship on drive shaft means 564, which may be a screw or other suitable means known to those skilled in the art. Encoding means, not shown but known to those skilled in the art, are disposed in tower frame 560 to indicate its position on the "A" axis relative to pivot point 520.

Tower drive unit 570 is mounted in driving relationship with drive shaft means 562 and includes slot units 571 in locked sliding engagement with tracks 561. Tower drive unit 570 thus may be moved up and down tower frame 560 along the "Y" axis, which runs through drive shaft 562. Position encoding means, not shown but known to those skilled in the art, are disposed to indicate the position of tower drive unit 570 on tower frame 560.

Tower drive unit 570 also includes a rotational drive shaft 573 mounted generally transverse to drive shaft means 562 and mounted parallel to the axis through pivot 520. Lead end nose clamp housing 574 is rotationally mounted on rotational drive shaft 573. Lead end nose clamp housing 574 includes a hydraulic cylinder or other suitable means for opening and closing upper clamping head block 481 on lead end nose clamp 400. Position encoding means, not shown but known to those skilled in the art, are disposed to indicate the angular degree to which lead end nose clamp housing assembly is rotated.

Figure 7:
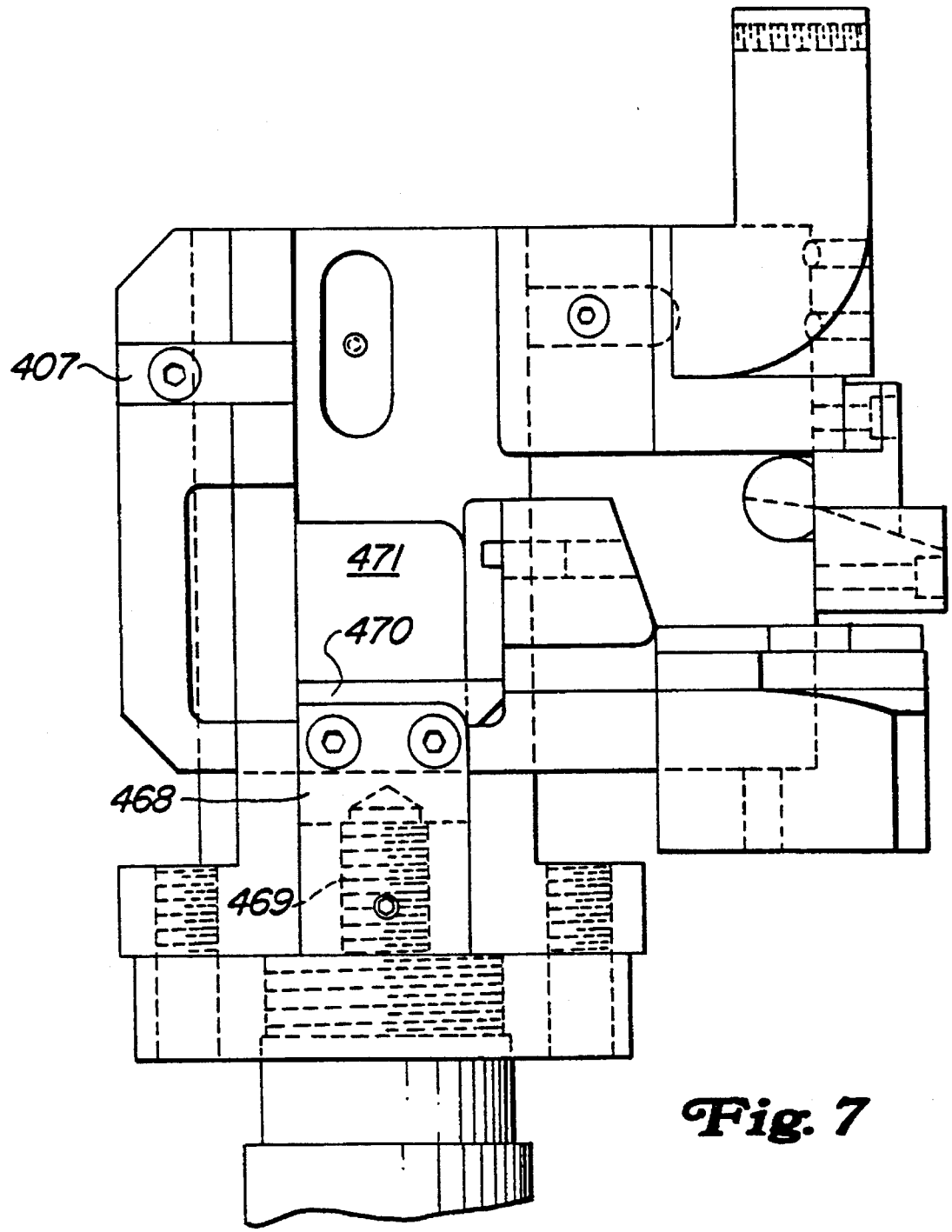
FIG. 7 is a front view of the back section of the head block of the lead end nose clamp showing the cylinder rod in the retracted position and also showing how the leads of the bobbin are bent by the removable tools used in that clamp.
Figure 8:
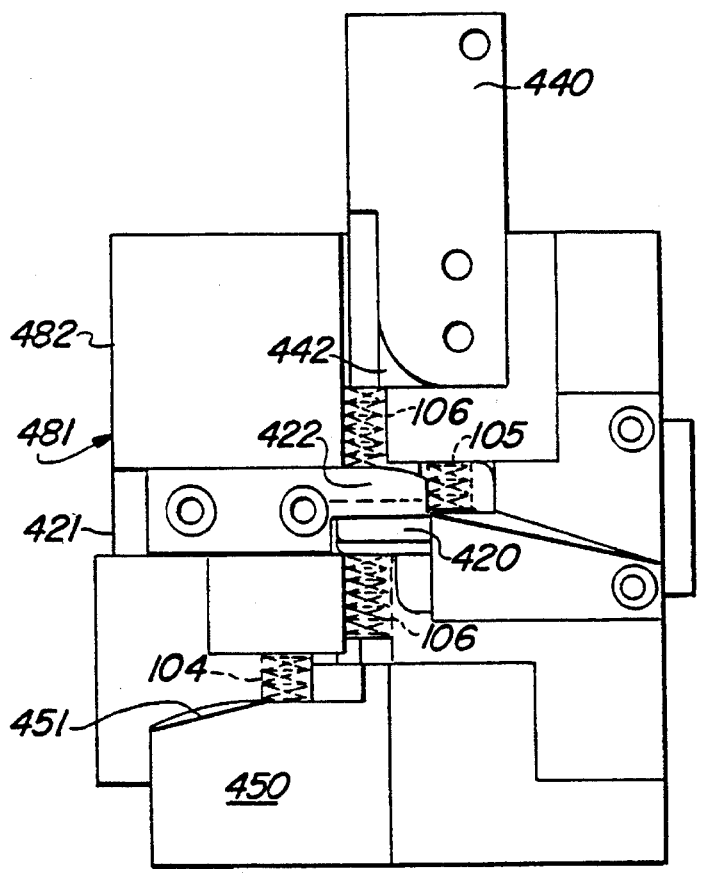
FIG. 8 is a side view of the back and front section of the head block of the lead end nose clamp in a closed position.

As shown in FIGS. 6–8, Lead end nose clamp 400 constitutes means for clamping the lead end nose 106 and associated lower lead 104 and upper lead 104 and for providing the desired angular turn to the lead end nose and the desired configuration of the leads. Lead end nose clamp 400 is thus used to form the lead end of the coil, and to configure the leads. Lead end nose clamp 400 includes back head block 401, and front clamping head block 481 (shown in FIG. 10) which clamps onto back head block 401 to hold the bobbin 101 in place during coil forming operation, and slide block 402, which is used to configure the leads of the bobbin.

As is shown in FIG. 6, back head block 401 includes slide block slot 403, which is adapted to receive slide block 402 in sliding arrangement therewith. Slide block 402 may be moved up and down in slide block slot 403 by a hydraulic cylinder 404 or other suitable means. Back head block 401 and slide block 402 are each provided with stop block slots 405 and 406 which are configured to receive stop block 407, which may be inserted into slots 405 and 406 and secured by a screw 408 or other suitable means to prevent slide block 402 from moving in slot 403.

Back head block 401 is provided with slot 410 for receiving lower lead 104 and is also provided with slot 411 for receiving upper lead 105. A clearance cavity defined by wall 412 is provided opposite slots 410 and 411 to provide sufficient space so that leads 104 and 105 do not strike wall 412 during the coil forming operation of apparatus 501.

Shelf 414 is provided proximate and upward of slot 410 to receive lead end nose 106. Depending on the dimensions of the bobbin, removable shelf 415 may be secured to the surface of shelf 414.

Figure 10:
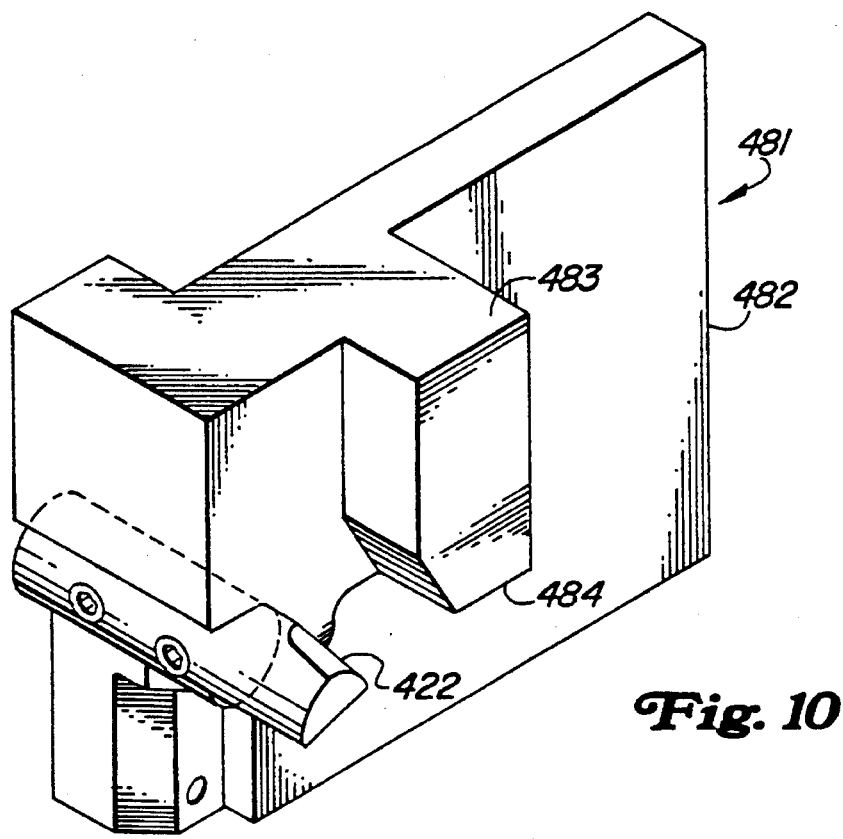
FIG. 10 is a view of the front clamping head block of the lead end nose clamp.
Figure 9:
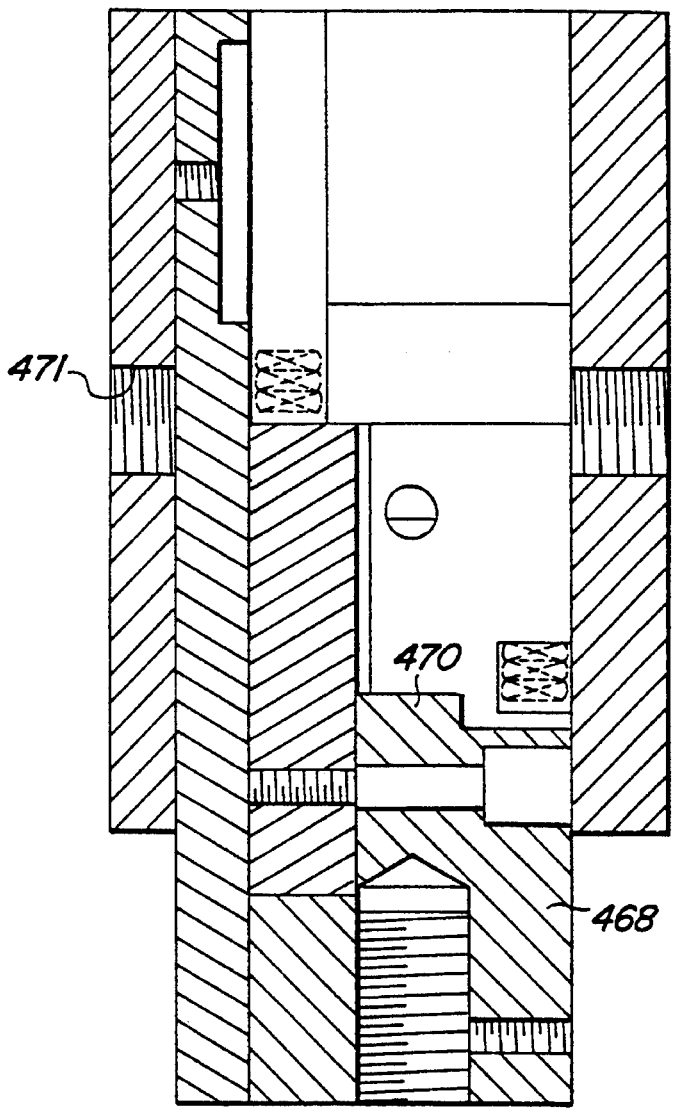
FIG. 9 is a sectional view of FIG. 6 taken along line X—X.

Lower half pin 420 of pin 421 is secured to block 401 upward of shelf 414 and removable shelf 415 a sufficient distance to provide room for the inner radius 120 of lead nose 106 to be placed around lower half pin 420 when the bobbin is initially placed in head block 400. Upper half pin 422 is secured to front clamping head block 481 as shown in FIG. 10 and mates with lower half pin 420 to form pin 421 when forming head clamp 400 is closed as shown in FIG. 8. The ends of lower half pin 420 and upper half pin 422 are rounded an amount sufficient to permit upper half pin 422 to slide into engagement with lower half pin 420 generally adjacent the inner radius 120 of lead end nose 106 without damaging the insulation of the copper wire or damaging the copper wire in the lead nose end of in bobbin 101.

Block 430 is secured to block 401 upward from lower half pin 421. The bottom portion 431 of block 401 partially defines slot 411. The side portion 432 of block 430 is generally cylindrical in shape and defines an opening when clamping block 481 is closed on block 401 for the nose end to be disposed about pin 421. The generally cylindrical shape side portion 432 provides a curved surface which aids in avoiding damage to the lead end nose 106 during coil forming operation.

Block 440 is movably mounted on the side portion 432 of block 430. Block 440 has arcuate wedge 441 extending outward from generally rounded surface 442. The arcuate wedge 441 and rounded surface contact the lead end nose 106 during coil forming operation and because of their respective configurations, do not damage the copper wire or insulation in the lead end nose 106. Block 440 may be moved up or down to accommodate bobbins having different dimensions.

Block 444 is secured to block 401 so that surface 445 is equiplanar with the surface of upper lead receiving slot 411. Surface 445 is provided with a generally curved downward slope. Surface 446, which is generally cylindrical in shape, extends upward from surface 445. Combined, surfaces 445 and 446 contact inner nose radius 106 and nose end arms 116 of bobbin 101 during coil forming operation, and the curved nature of their surfaces prevents damage to the wire or insulation of the bobbin.

Block 452 defines the upper edge of slot 410. Block 452 is secured to block 401 and may be interchanged with other similarly shaped blocks to alter the dimensions of slot 410 in accordance with the dimensions of the bobbin. Block 450 defines the lower edge of slot 410. Upper surface 451 of block 450 which defines slot 410 is widest at the end farthest from slide block slot 403, and that end is rounded and somewhat downwardly curved at the end furthest from slot 411. Upper surface 451 gradually narrows in an arcuate manner so that the narrowest part is the part closest to the slide block slot 403.

Slide block 402 is adapted to slide in slide block slot 403. Slide block 402 includes back wall 460. Side wall 461 projects at right angles from back wall 460 and is spaced from one side to define a lip 462 that fits in sliding engagement with slot 463 in block 401. The outer edge of wall 461 is configured to define a clearance cavity for the leads of the bobbin in conjunction with wall 412 of back head block 401 when slide block 402 is in its upper most position in back head block 401.

Slide block 402 also includes base plate 464, which is adapted to be secured to cylinder head 465. Flange 466 of block 401 is disposed perpendicular to base plate 464 and is adapted to butt against flange 466 of back head block 401 to stop upward movement of the slide block. Slide block 402 further includes means for securing additional tools, such as screw hole 467, for the purposes discussed below.

As mentioned above, cylinder 404 has base plate 465 secured to cylinder 404. Base plate 465 is also secured to base plate 464 of slide block 402, so that when cylinder 404 moves, it causes slide block 402 to move. Block 468 is secured to cylinder rod 469. Block 470 is secured to the back of block 468, and projects slightly upward of block 468. Optional back block 471 may be secured behind block 470. Cylinder rod 469 may advance blocks 468, 470 and 471 upward with respect to cylinder 404 and the attached slide block 402. Cylinder 404 is free floating, so when cylinder rod 469 is activated, it exerts a force on cylinder 404 and causes it and the slide block 402 attached to it to move in the opposite direction. Flange 472 of cylinder rod block 470 is adapted to restrict the downward movement of slide block 402 by striking flange 466 of block 401.

Front clamping head block 481 includes a cover plate 482, lead guide block 483 which is adapted so that its lower side 484 define the upper side of a portion of slot 411 when upper clamping head block closes on back head block 401. Half pin 422 is secured to cover plate 482 in such a manner that when clamping head block closes on back head block 401, half pin 422 mates with half pin 420 to form pin 421. The end of half pin 422 is rounded so that if half pin 422 touches inner nose radius 120 of inner lead end nose 106, the copper wire will slide off of the head of half pin 422 and neither the copper wire nor the insulation on the wire in that part of the bobbin will suffer any damage. Portion 485 of the end of cover plate 482 proximate to half pin 422 is generally cylindrically shaped so that the arm of the bobbin wire in proximity thereto during coil forming operation will not suffer any damage.

One example of how the leads can be bent to their desired shape can be appreciated from a comparison of FIGS. 6, 7 and 8. FIG. 7 shows the position of tools 468, 470 and 471 when cylinder rod 469 is in a retracted position. FIGS. 6 and 8 show the position of the same tools when cylinder rod 469 is in an extended position. When stop block 407 is inserted into slots 405 and 406, slide block 402 cannot move. When cylinder rod 469 is activated, it drives tools 468, 470 and 471 upward, and those tools bend lead wires 104 and 105 which are maintained in position in slots 410 and 411 and which project into the cavity into which tools 468, 470 and 471 are driven.

Referring back to FIG. 5, opposite lead end nose clamp assembly 507 includes tower frame 580 which is provided with tracks 581 and drive shaft means 582. Tower frame 580 includes a track riding unit 583 which is mounted in driving relationship on drive shaft means 584, which may be a screw or other suitable means known to those skilled in the art, and which is used to move tower frame toward or away from pivot point 520, depending on the dimensions of the bobbin. Encoding means, not shown but known to those skilled in the art, are disposed in tower frame 580 to indicate its position relative to pivot point 520.

Tower drive unit 590 is mounted in driving relationship with drive shaft means 582 and includes slot units 591 in locked sliding engagement with tracks 581. Tower drive unit 590 thus may be moved up and down tower frame 580 along the "X" axis, which runs through drive shaft 582. Position encoding means, not shown but known to those skilled in the art, are disposed to indicate the position of tower drive unit 590 on tower frame 580.

Tower drive unit 590 also includes a rotational drive shaft 593 mounted generally transverse to drive shaft means 582 and mounted parallel to the axis through pivot 520. Opposite lead end nose clamp housing 594 is rotationally mounted on rotational drive shaft 593. Lead end nose clamp housing 594 includes a hydraulic cylinder 595 or other suitable means for opening and closing upper clamping head block 601 on opposite lead end nose clamp 600. Position encoding means, not shown but known to those skilled in the art, are disposed to indicate the angular degree to which opposite lead end nose clamp housing assembly is rotated.

Figure 11:
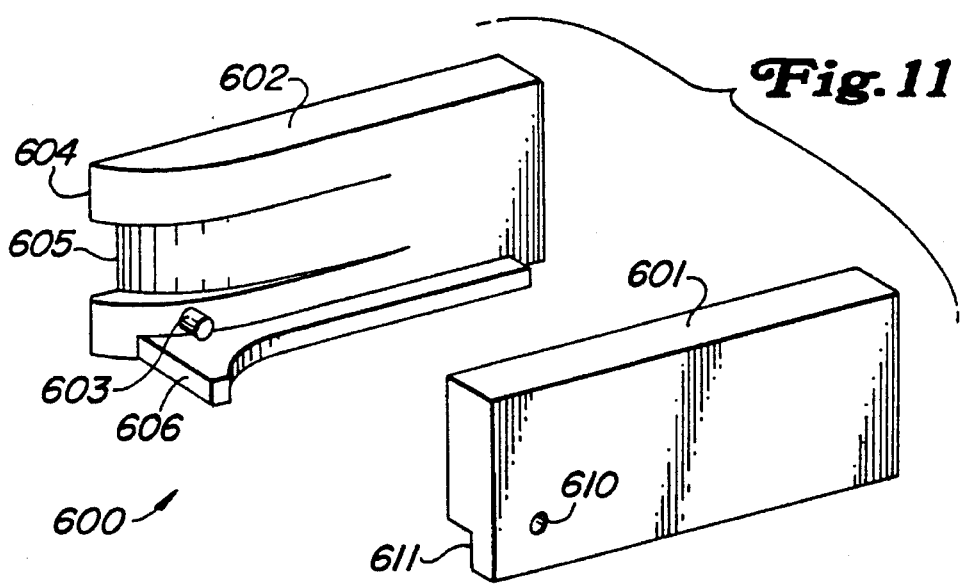
FIG. 11 is an elevational view of the opposite lead end clamp.
Figure 9A:
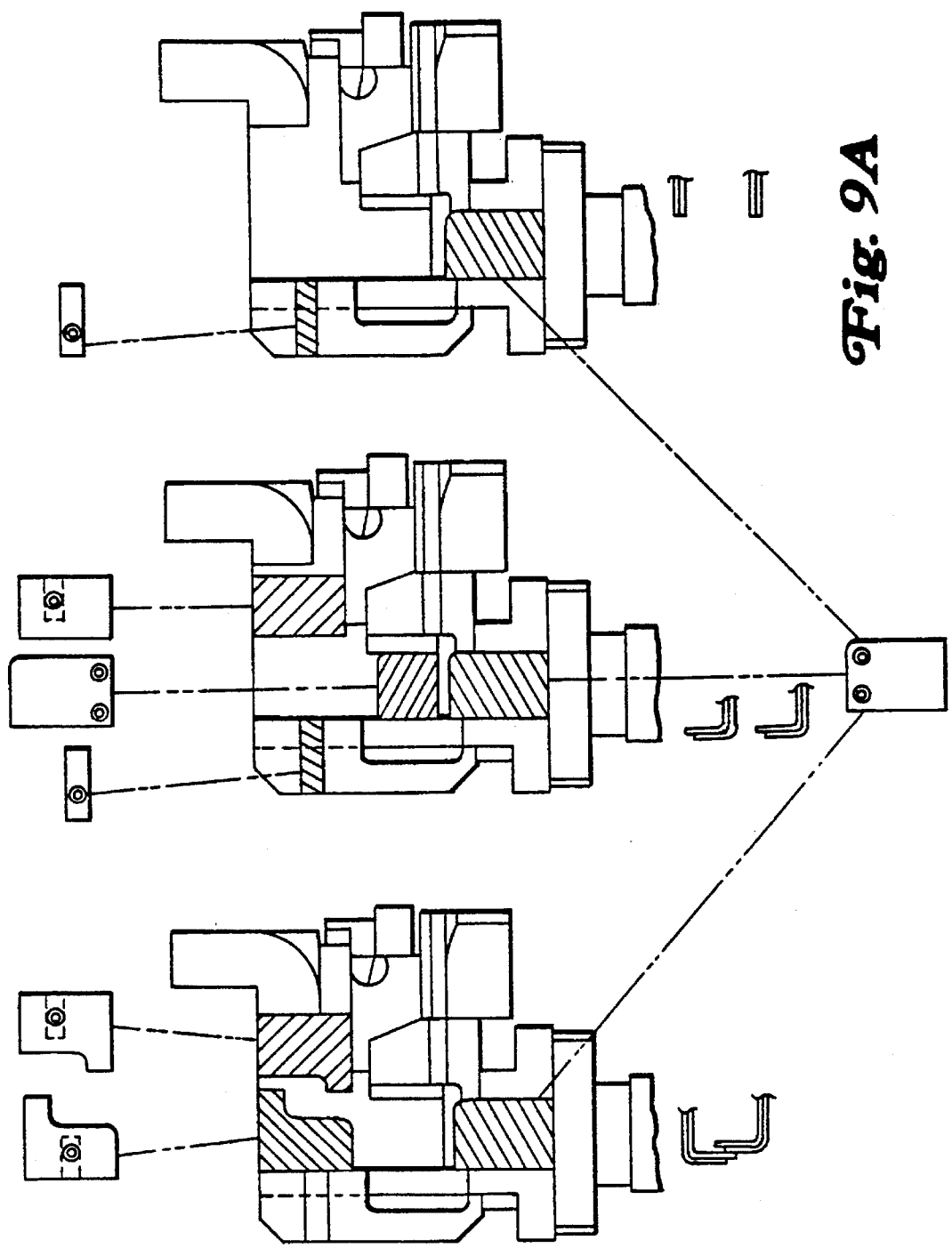
FIG. 9A is a front view of the back section of the lead end nose clamp which shows three side views of the lower head block of the lead end nose clamp with the removable lead bending parts darkened to demonstrate those parts and to show the lead configurations that they produce.

As is shown in FIG. 11, opposite lead end clamp 600 includes upper plate 601 and lower plate 602. Lower plate 602 includes pin 603 which is rounded at its end. Lower plate 602 has a generally cylindrical surface 604 at the end that is disposed closest to pivot 520, and has a cutout 605 to define a cavity into which arm 117 of bobbin 101 may fit when bobbin 101 is placed in the clamp. Shelf 606 is disposed underneath and spaced from pin 603 and provides a shelf on which arm 112 of bobbin 101 may rest when bobbin 101 is placed in the clamp. Upper plate 601 has a hole 610 adapted to receive pin 603 and has a cutout 611 adapted to define a space in conjunction with lower plate 602 in which arm 112 rests when bobbin 101 is placed in the clamp.

When the coil forming apparatus of this invention is operated, all clamps are open so that the bobbin may be properly placed in the clamps. As is described below, bobbin dimensions are provided to a control system, and the control system activates the means that turn drive shafts 564 and 584 which move tower frames 560 and 580, and therefore lead end clamp 400 and opposite lead end clamp 600 are moved into position so that opposite lead end nose 107 is placed in opposite nose end clamp 600 such that inner radius 121 of opposite lead end nose is placed snugly adjacent pin 603 and lead end nose 106 may be placed over lower half pin 120 and the leads set in slots 410 and 411. Straight length portion 115 of upper leg 103 of bobbin 101 is placed in upper leg clamps 531 which are disposed so that the rear face of shutter 770 holds the outer edge of straight length portion 115 and the radius forming block 791 is positioned to form the radii in the coil between the straight edge portion 115 and the nose end arms 116 and 117. Similarly, straight length portion 110 of lower leg 102 of bobbin 101 is placed in lower leg clamps 551 which are disposed so that the straight face 722 of each clamp 551 holds the outer edge of straight length portion 110 and the radius forming block 725 is positioned to form the radii in the coil between the straight edge portion and the nose end arms 111 and 112.

As is mentioned above upper and lower leg clamps 531 and 551 are equipped with radius forming blocks, which create the radii at the end of each straight end portion of each leg.

To spread the bobbin to form the coil, tower frame 510 which contains the upper clamp assembly, is pivoted outward to a prescribed angle about pivot 520, and tower frame 540, which contains the lower clamp assembly, is pivoted in the opposite direction to a prescribed angle about pivot 520. Thus, the bobbin legs are spread apart and are turned at the angle to which the tower frames are rotated. Pivot point 520 is located at the same distance from the bobbin legs in the clamps as the distance from the slots in the stator core in which the coil will be place is from the center of the stator core. Thus, the legs of the coil are positioned by the apparatus so as to fit exactly in the stator core.

As mentioned above, the lead end clamp 400 and opposite lead end clamp 600 hold the lead end nose and the opposite lead end nose. The assemblies which hold those clamps are allowed to free float during the operation which spreads the legs of the bobbin, except that about 15 pounds of pressure is applied by pneumatic means in an outward direction along axis "A" (shown in FIG. 5). Thus, when the legs of the bobbins are spread, lead end clamp 400 and opposite lead end clamp 600 are pulled toward the pivot point 520 of apparatus 501. When the legs of the bobbin are spread to the prescribed distance, nose end clamps 400 and 600 are rotated by drives 573 and 593 to give the noses the prescribed angle. In addition, if it is desired to raise either nose, either assembly 570 or assembly 590 may be moved upward by drives 562 or 582.

Figure 5A:
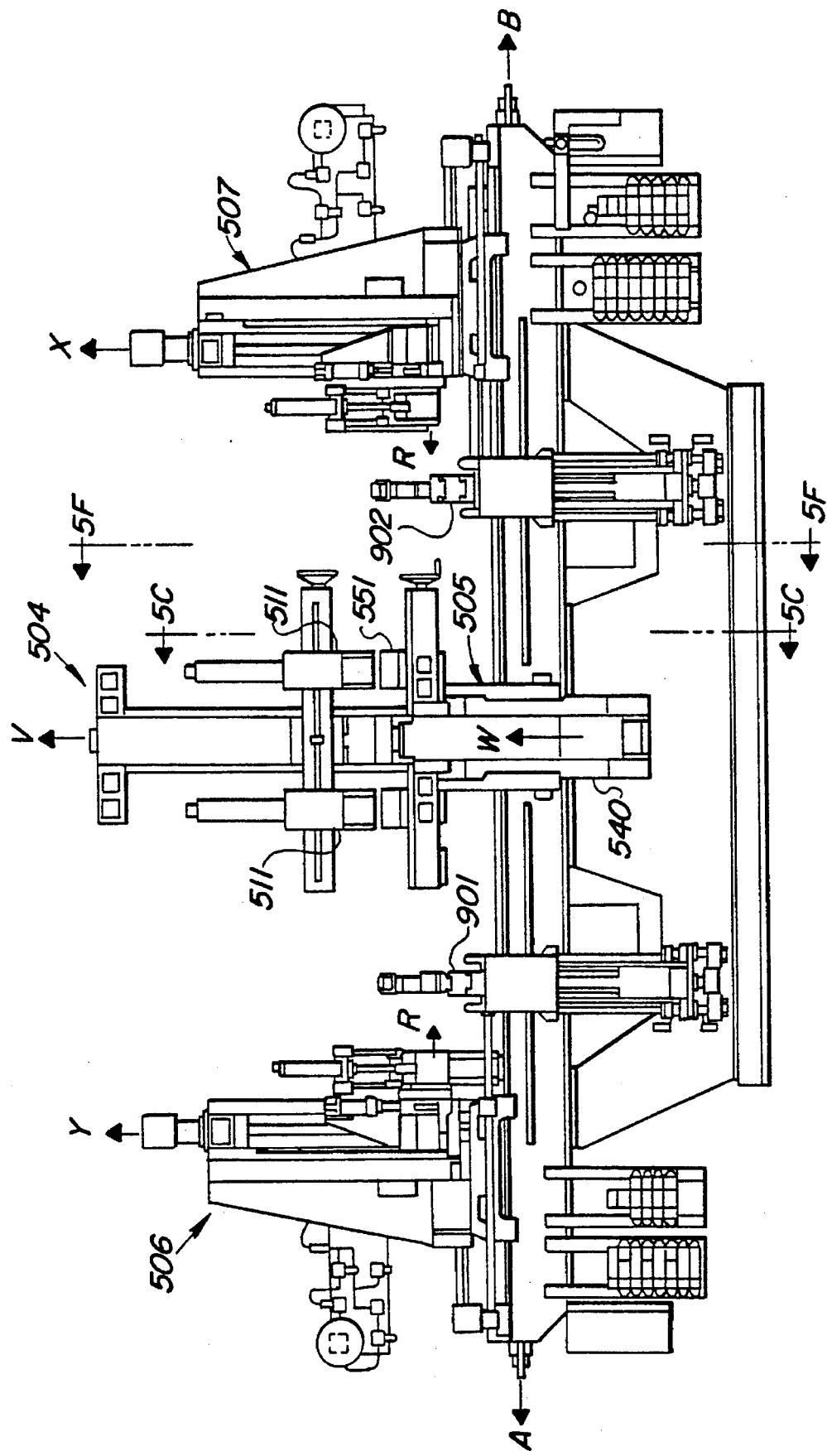
FIG. 5A is a front view showing the major components of another embodiment of an apparatus for the present invention.
Figure 15:
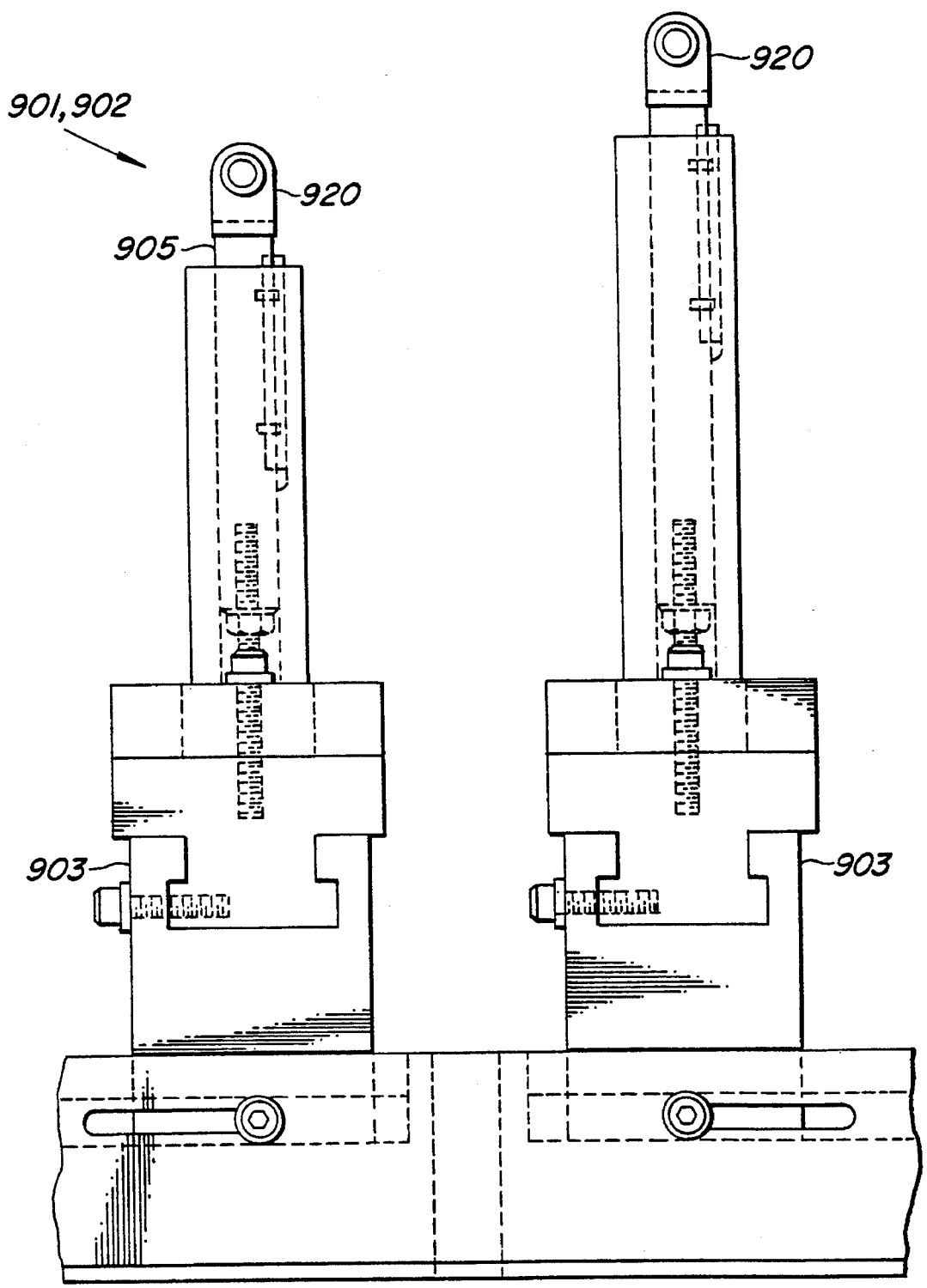
FIG. 15 is a front view of the arc formers for the nose end arms of the bobbin.
Figure 16:
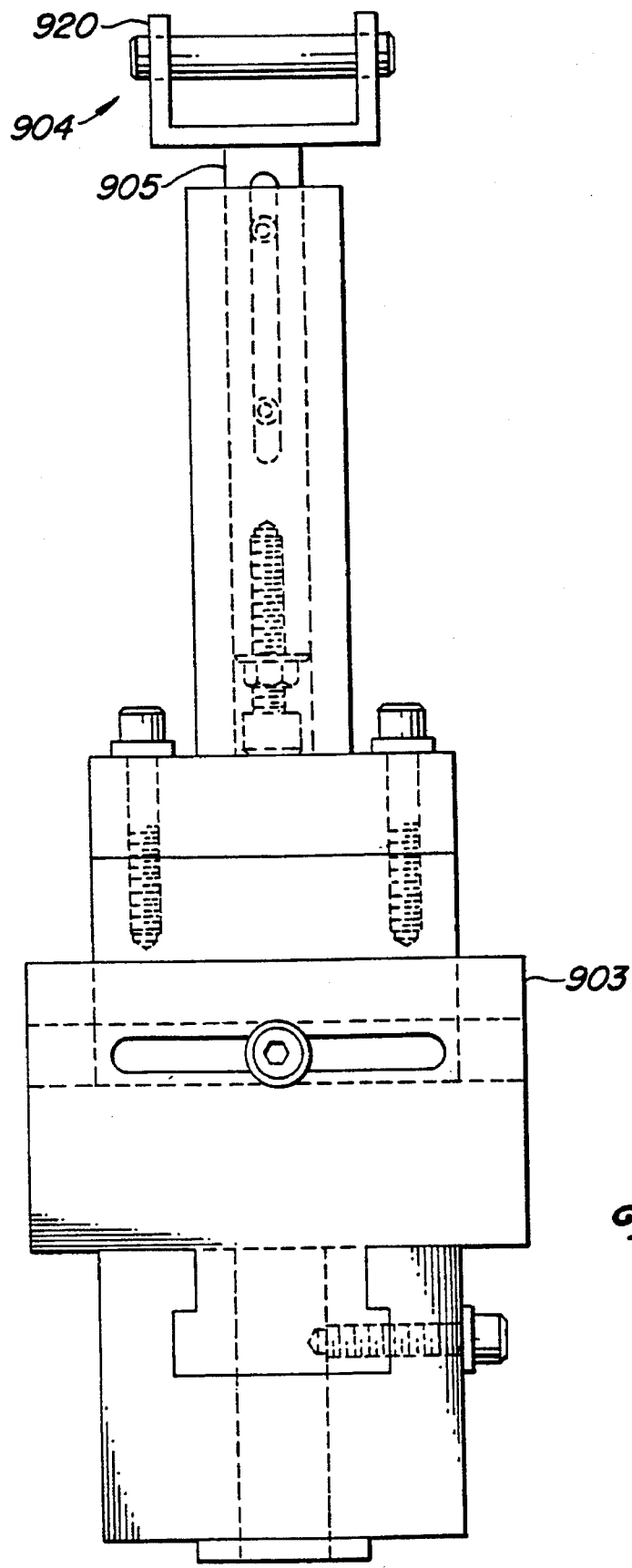
FIG. 16 is a side view of the arc formers for the nose end arms of the bobbin.
Figure 17A:
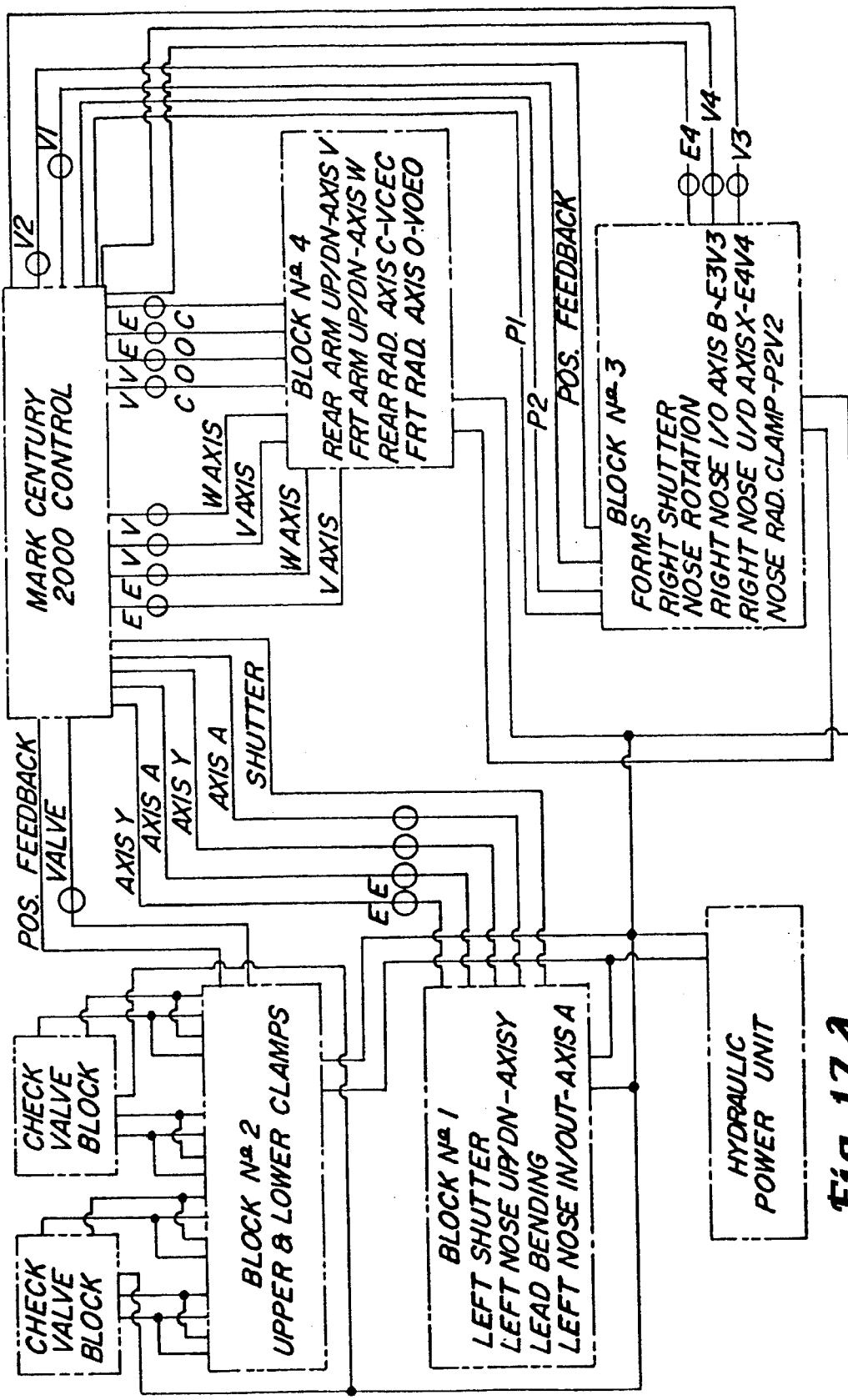
Figure 17B:
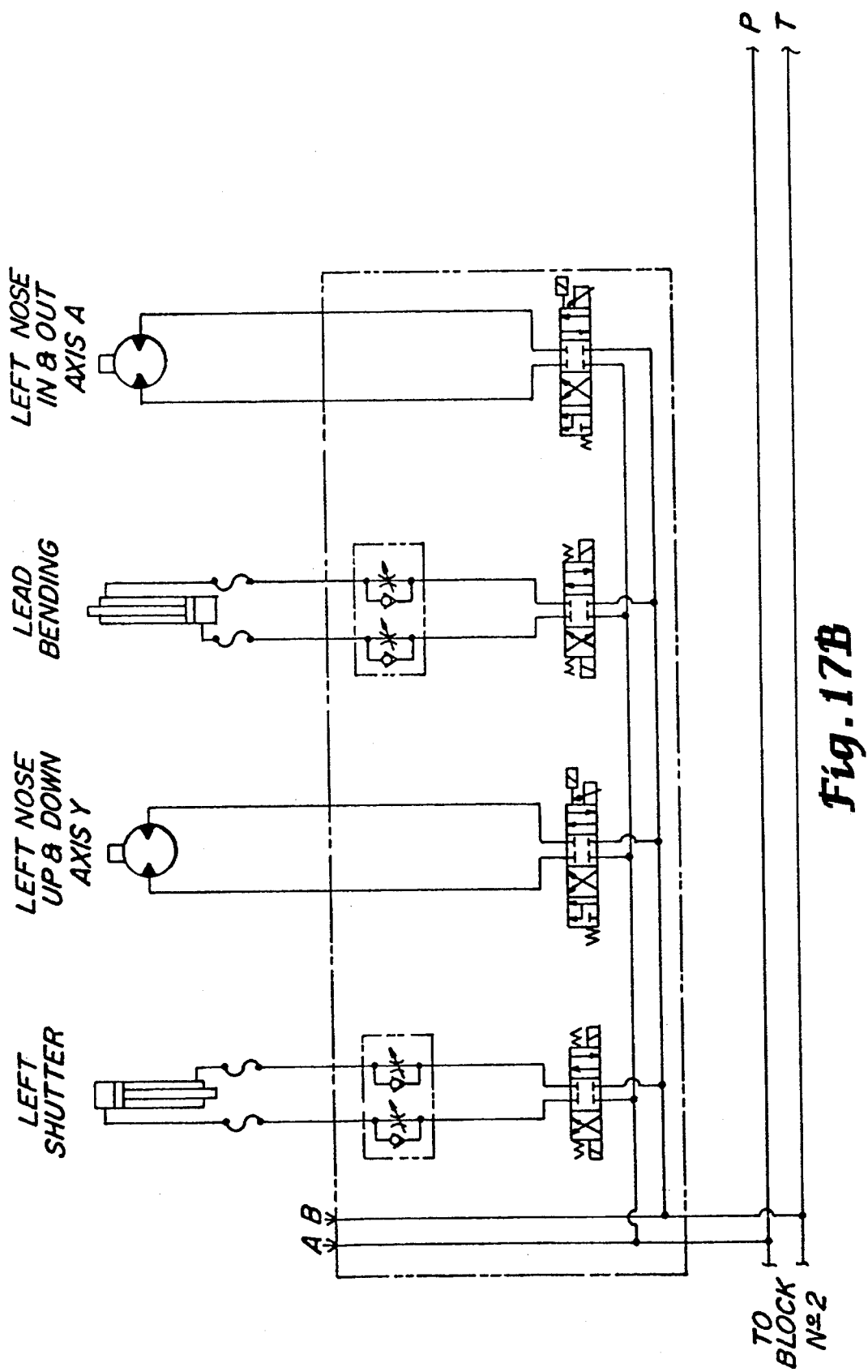
Figure 17C:
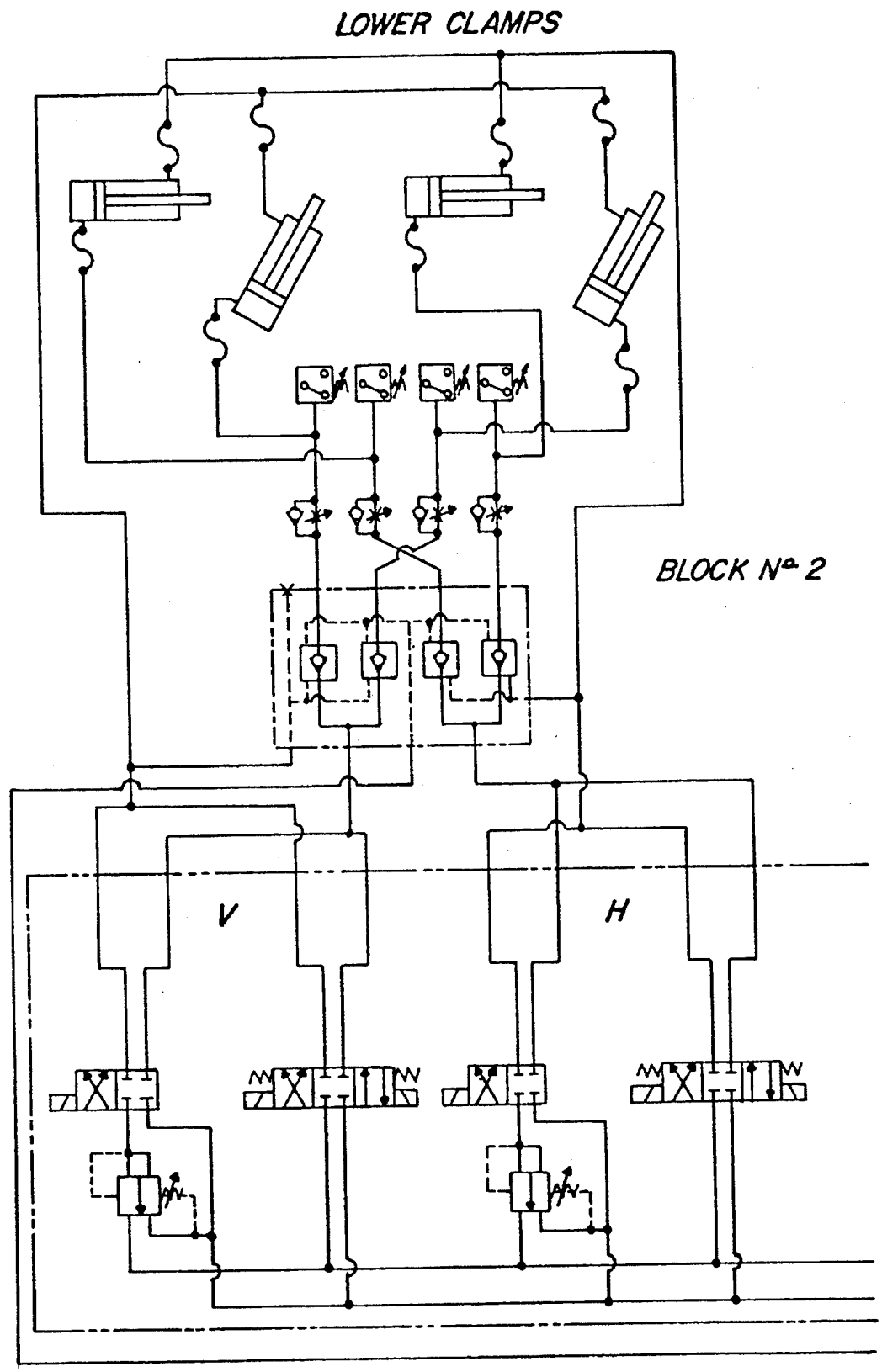
Figure 7D:
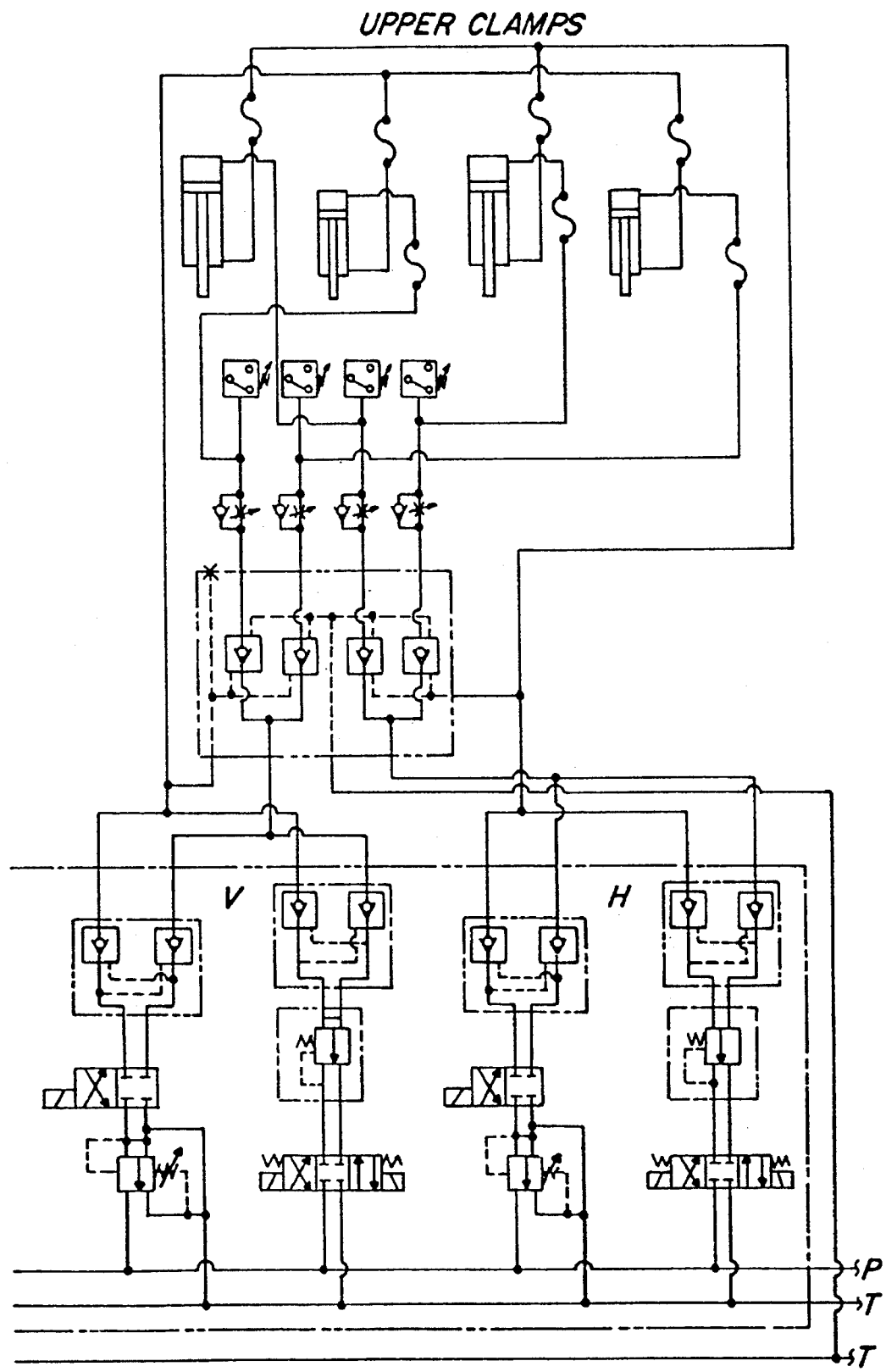
Figure 17E:
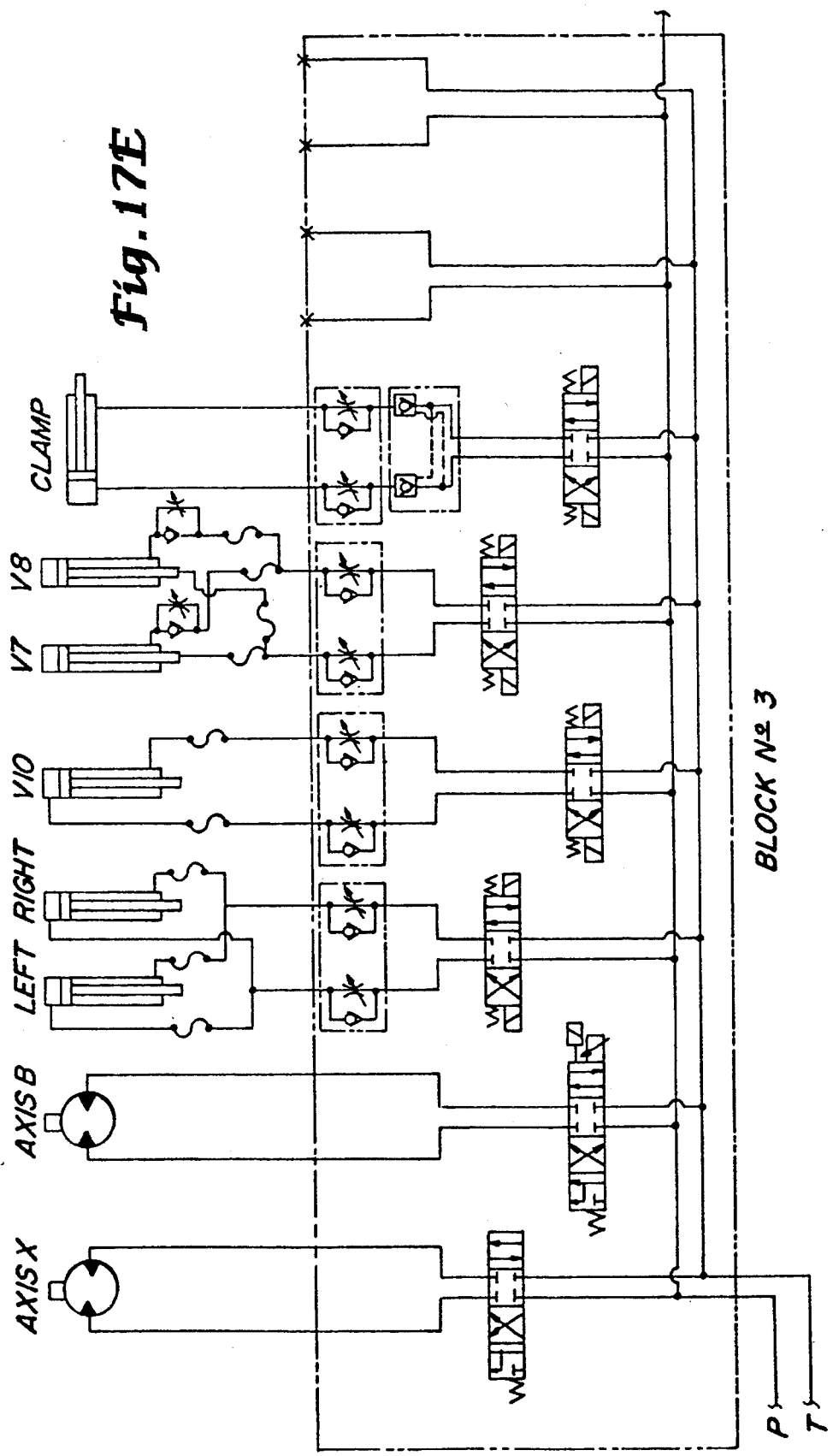
Figure 17F:
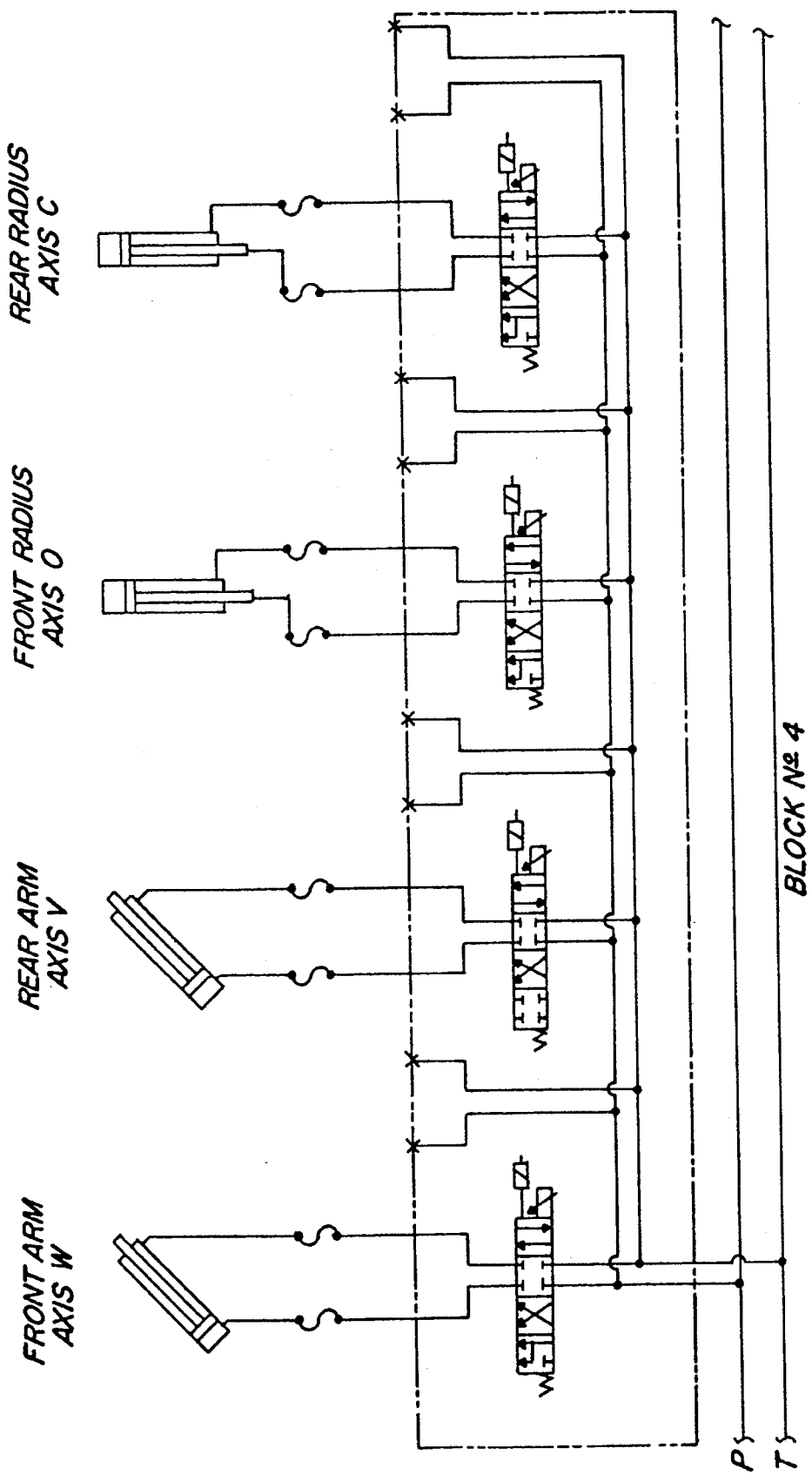
Figure 17G:
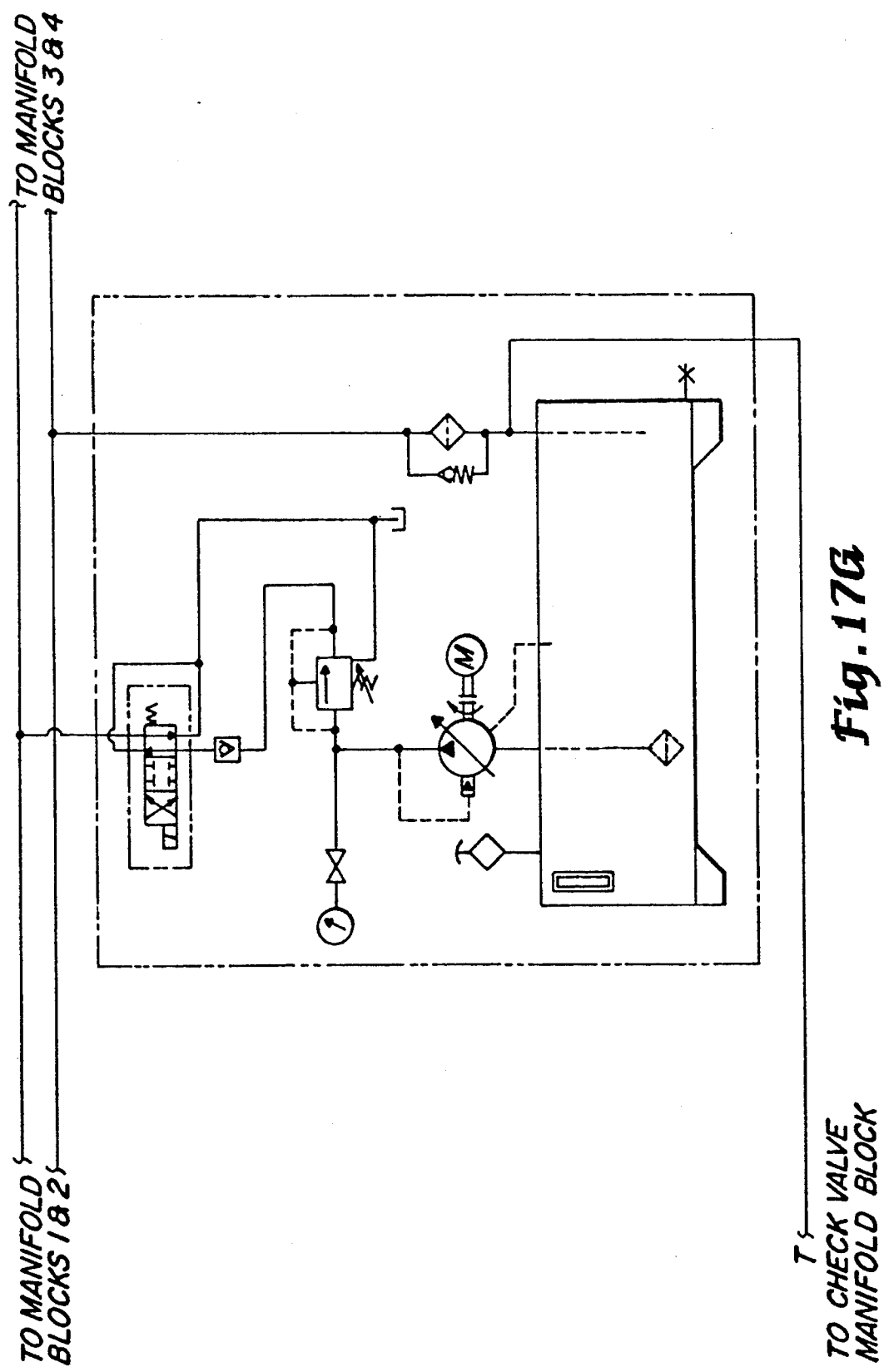

Finally, arc formers 901 and 902 shown diagrammatically in FIG. 5 and shown in more detail in FIG. 5A and FIGS. 15 and 16, engage the arms of the bobbin and provide them with the desired radius. Visual position indication means or automated position encoding means, not shown but known to those skilled in the art, are disposed to indicate the position of the arc formers along the "A" and "B" axis. As is shown in FIGS. 15 and 16, arc formers 901 and 902 each consist of means 903 for engaging the tracks along the "A" and "B" axis shown in FIG. 5 for moving the arc formers along axis "A" and axis "B". It further consists of nose arm engaging means 904 for engaging the nose end arms. Each nose engaging means includes a cradle 920 mounted so that the surface of the cradle may engage with the nose arm. Rod 905 is engaged with suitable driving means, such as hydraulic means, for extending cradle 920 into a holding relationship with the nose arm and for bending the nose arm to the prescribed radius. Each arc former is positioned so that it engages its respective nose arm in a position to create a radius of the desired shape and configuration, as may be appreciated by those skilled in the art.

FIGS. 2–4 aid in understanding the operations of the apparatus described above. Each of upper leg clamps 531 and lower leg clamps 551, which spread legs 102 and 103, has a straight portion which is secured at the ends 110a and 110b and 115a and 115b of the straight end portions of the lower and upper legs 102 and 103 of the bobbin. Each of those clamps also has a radius forming portion which is positioned to form radii 130, 131, 132 and 133 when the legs are spread apart. Also, after the legs are spread to their predetermined position, arc formers engage coil nose arms 134, 135, 136 and 137 to form arcs 138 and 139, as can be seen by FIG. 4, which is an end view of the coil.

Lead nose end clamp 400 also forms outer nose radii 144 and 145 at the nose ends of nose end arms 134 and 135 and forms outer nose radii 146 and 147 of leads 105 and 104.

FIG. 3 shows the "drop" (the degree to which the arms are bent away from the stator core) which is formed after the legs are spread to their predetermined position by raising at least one nose end. The nose ends may be raised by raising lead nose end clamp 400 and/or opposite lead nose end clamp 600 (see FIG. 5). The nose end clamps also provide angular rotations 141 and 142 of nose ends 106 and 107 of the coil.

Thus, the apparatus of this invention can convert a bobbin to a finished formed stator coil in about 45 seconds.

The various means for moving the clamps in apparatus 501 may be powered by any suitable means. FIGS. 17A through 17G disclose one suitable hydraulic system which may be used, as will be understood by those skilled in the art. That system may be controlled by any suitable automatic control system. One suitable control system is a Mark Century 2000 Computer Numerical Control manufactured by the General Electric Company, which is a standard computer system for industrial applications. It may be programmed by those skilled in the art to control the movements of the clamps in the desired manner.

As shown in FIG. 17-1, the encoders provide position feedback to the Mark Century 2000 Control, which provides commands to operate the valves in the hydraulic system.

Referring to FIGS. 18 through 24 alternate embodiments of various components of the coil forming apparatus 501 are illustrated. These alternate embodiments find particular application in the forming of stator coils for those stators having smaller diameters.

Referring to FIG. 18 in conjunction with FIG. 1, an alternate embodiment of the nose clamp assembly is generally indicated at 1000. The nose clamp 1000 includes an inner clamping arrangement 1002, which is operably connected to an outer pneumatic cylinder 1004 found within an outer tubular casing 1005.

The inner clamping arrangement 1002 includes a rearward jaw 1008 and an opposing forward jaw 1012 which are hingeably mounted onto a pair of parallel pins 1014. The pins 1014 are mounted to a frame 1016 which is attached to the hydraulic cylinder 1004. The rearward jaw 1008 and forward jaw 1012 are movable between an open position as shown in FIG. 18 and a closed position as illustrated in FIG. 19. Each of the pins includes a biasing element which contacts the corresponding forward jaw 1012 or rearward jaw 1008 to force the corresponding jaw into the open position.

To prevent the nose ends 106, 107 of the bobbin from being pulled out of the nose clamp 1000 during the coil forming process, the rearward jaw 1008 has a positioning pin 1018 which extends outward from a front face 1008a of the rearward jaw. The forward jaw 1012 forms a slot 1022 which is adapted to receive pin 1018 when the jaws are in the closed position. The rearward jaw 1008 and forward jaw 1012 are sized so that when the nose ends 106, 107 are positioned between the opposing jaws 1008, 1012 in the closed position, the pin 1018 extends generally adjacent the inner radii 120, 121 of nose ends 106, 107.

The forward clamping arrangement 1002 also includes a camming mechanism 1024 for moving the forward jaw 1012 and rearward jaw 1008 from the open position to the close position. The mechanism 1024 includes a horizontally extending T-shaped plunger 1028 which is reciprocally driven by the pneumatic cylinder 1004. When the plunger 1028 is pulled inward by the hydraulic cylinder 1004, the plunger engages a pair of cams 1030 formed along the lower edge of the rearward jaw 1008 and forward jaw 1012 to force the forward jaw and rearward jaw into the closed position against the biasing force supplied by the pins 1018.

Referring also to FIG. 2, to form the desired curvature of the coil 101a at radii 146, 147 of nose end 106 and radii 148, 149 of nose end 107, a lower portion 1034a of an outer side 1034 of the forward jaw 1012 and outer side 1036 of rearward jaw 1008 formed curved surfaces that deform the bobbin 101 into the desired configuration during the coil forming operation.

Figure 20:
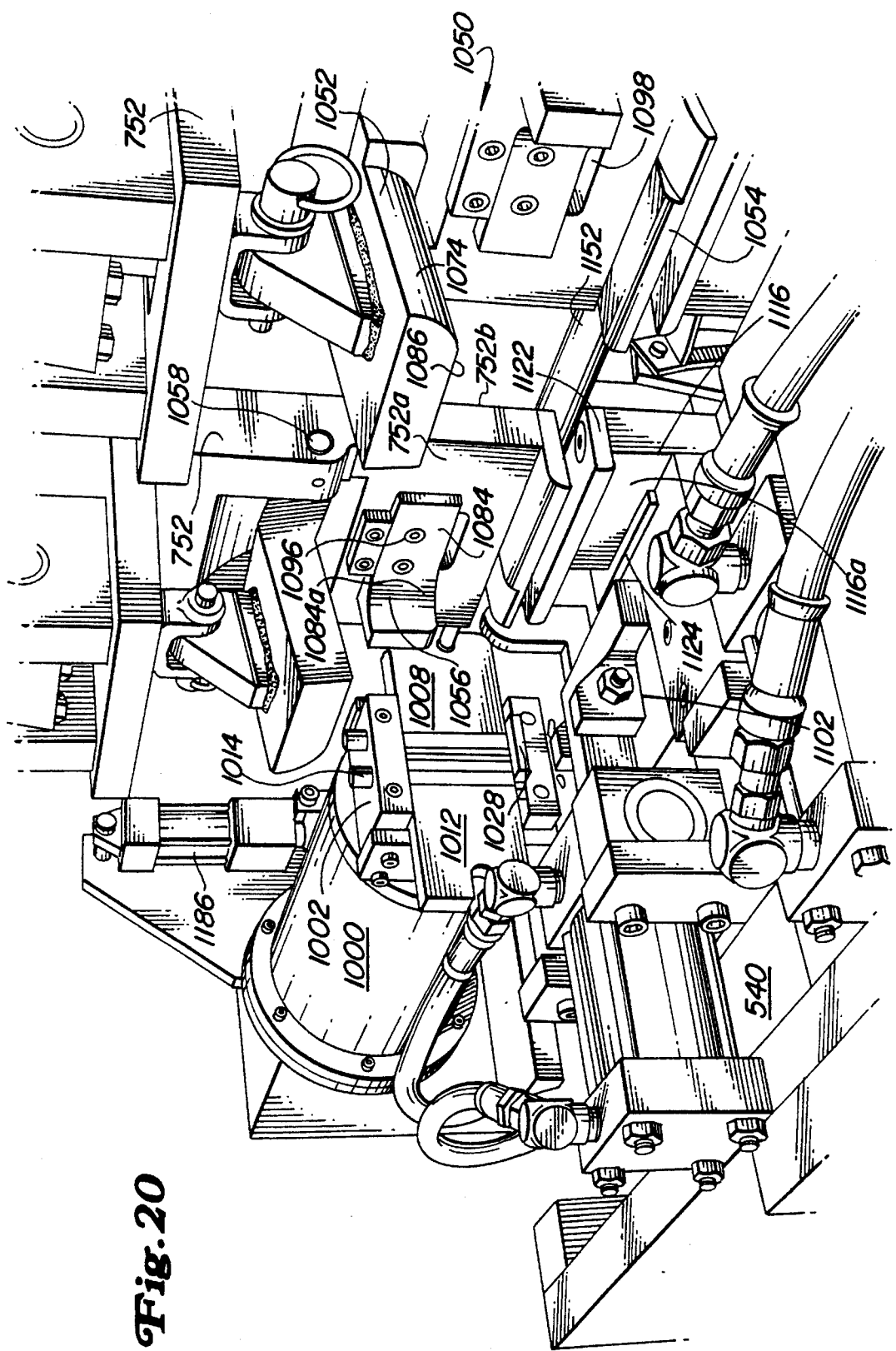
FIG. 20 is a partial perspective view of the apparatus of FIG. 19 viewed in an alternate direction.
Figure 22:
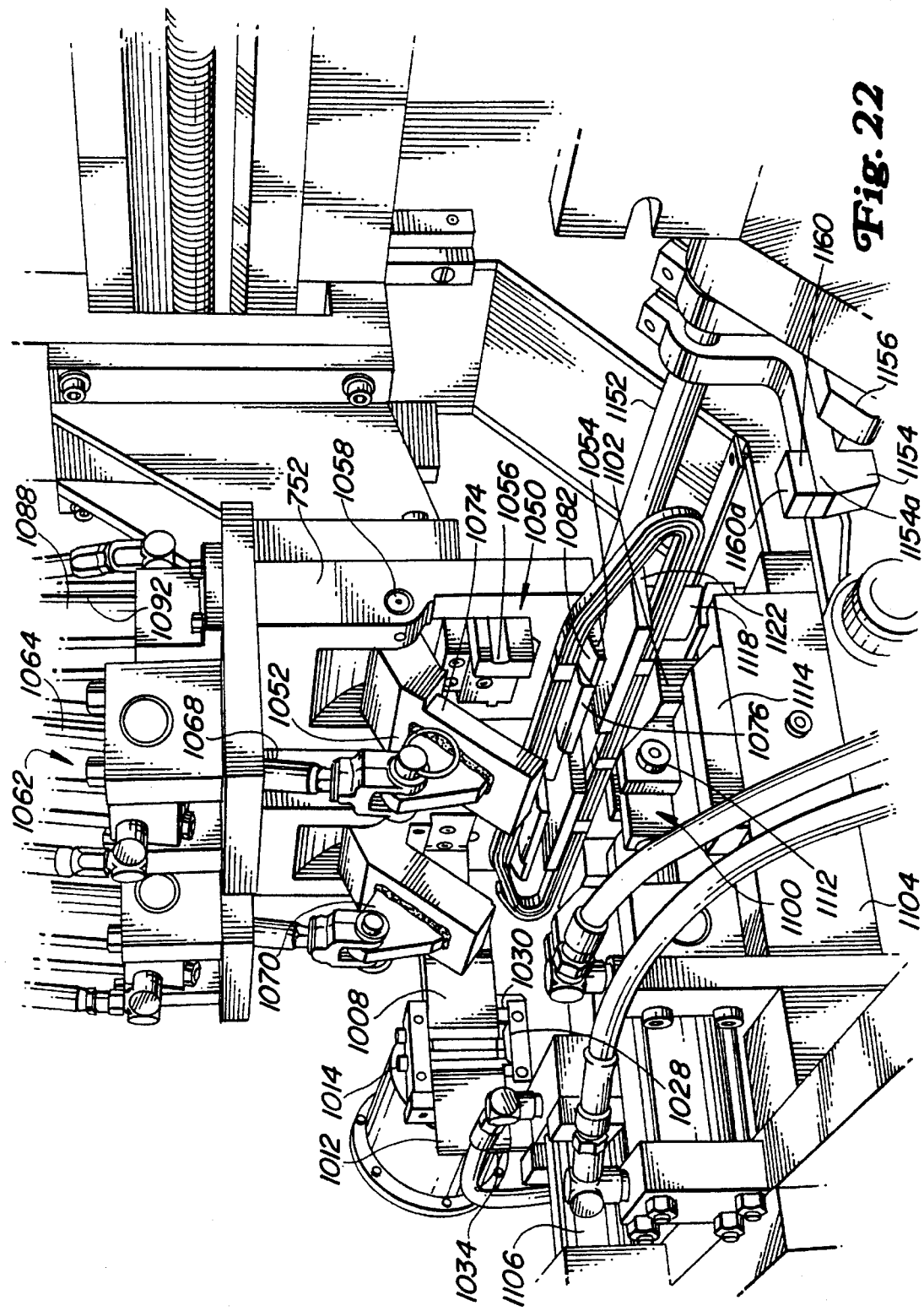
FIG. 22 is a partial perspective view coil forming apparatus of FIG. 19 illustrating a loaded bobbin and an early stage of the coil forming process.

Referring to FIGS. 20 and 22, an alternate embodiment of the upper leg clamps is generally indicated at 1050. The upper leg clamps 1050 include an upper forming flange 1052, a lower positioning flange 1054 and intermediate locking flange 1056. The upper forming flange 1052 is pivotally mounted to pin 1058, which is mounted to the frame 752.

Figure 23:
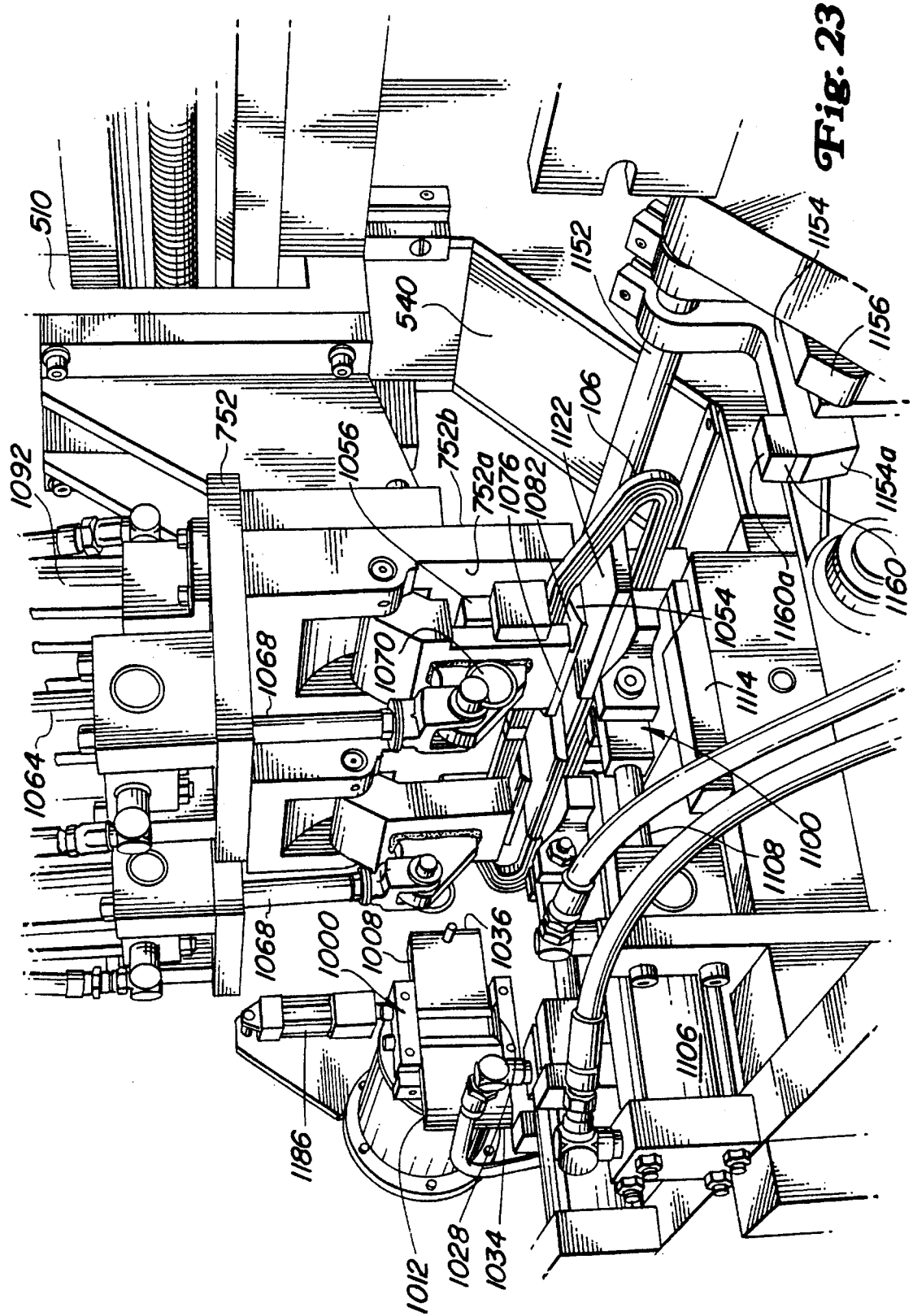
FIG. 23 is a partial perspective view of the apparatus of FIG. 19 illustrating an intermediate stage in the coil forming process.

To pivot the forming flange 1052 about pin 1058 from an open position, as shown in FIG. 20, to a closed position as shown in FIG. 23, the upper leg clamps 1050 are operably connected to an actuating assembly 1062. The actuating assembly 1062 includes a hydraulic cylinder 1064 which is pivotally mounted to the frame 752. A rod 1068 of the hydraulic cylinder 1064 is rotatably attached to a bracket 1070 which is attached to the back side of the upper forming flange 1052. As best seen in FIGS. 19 and 20, the upper forming flange 1052 includes a rounded outer side 1074 which is configured to form radii 130, 131, of the upper leg 103 when the legs 102 and 103 of the bobbin 101 are spread apart during the coil forming operation.

Referring to FIG. 22, The lower positioning flange 1054 extends forward from a bottom end of frame 752 vertically below the upper forming flange 1052. The lower flange 1054 includes a middle portion 1076 which is configured to mate with a lower end 1076 of the upper flange 1052 when the upper flange is in the closed position (FIG. 23).

Referring to FIG. 20, the intermediate locking flange 1056 has a forward surface 1084a configured to matingly engage the rearward surface 1086 and the outer side 1074 of the upper forming flange 1052. The thickness of the intermediate flange opposite the rearward surface 1086 corresponds to the thickness of the legs 102, 103 of the bobbin 101 to form the proper spacing for the upper leg 103 of the bobbin 101 between the upper clamping flange 1052 and rearward frame 752.

Referring to FIGS. 20 and 22, the intermediate locking flange 1056 is operably attached to an actuating assembly 1088 so that the intermediate locking flange may be slidably and vertically moved along the forward face 752a of the frame 752. The actuating assembly 1088 includes a hydraulic cylinder 1092 which is mounted to the frame 752 rearward of the hydraulic cylinder 1064. A rod (not shown) of the hydraulic cylinder 1092 engages a bracket (not shown) which slides along the rearward face 752b of the frame 752. The bracket is connected to the locking flange 1062 by bolts 1096 which extend through an aperture 1098 in the frame 752. The aperture 1098 is sized so that there is sufficient clearance for moving the locking flange 1056 between an up position as shown in FIG. 20 and a lower position as shown in FIG. 23. In the lower position, the locking flange 1056 locks or pins the upper leg of the bobbin between the locking flange and lower flange 1054.

Referring to FIGS. 22 and 23, an alternate embodiment of the lower leg clamps, is generally indicated at 1100, and includes a plunger block 1102 which slides forward and rearward along base 1104. The block 1102 is operably reciprocated by hydraulic cylinder 1106 which has a rod 1108 which is attached to a bracket 1112. The bracket 1112 is fixably attached to the top of the block 1102.

Figure 24:
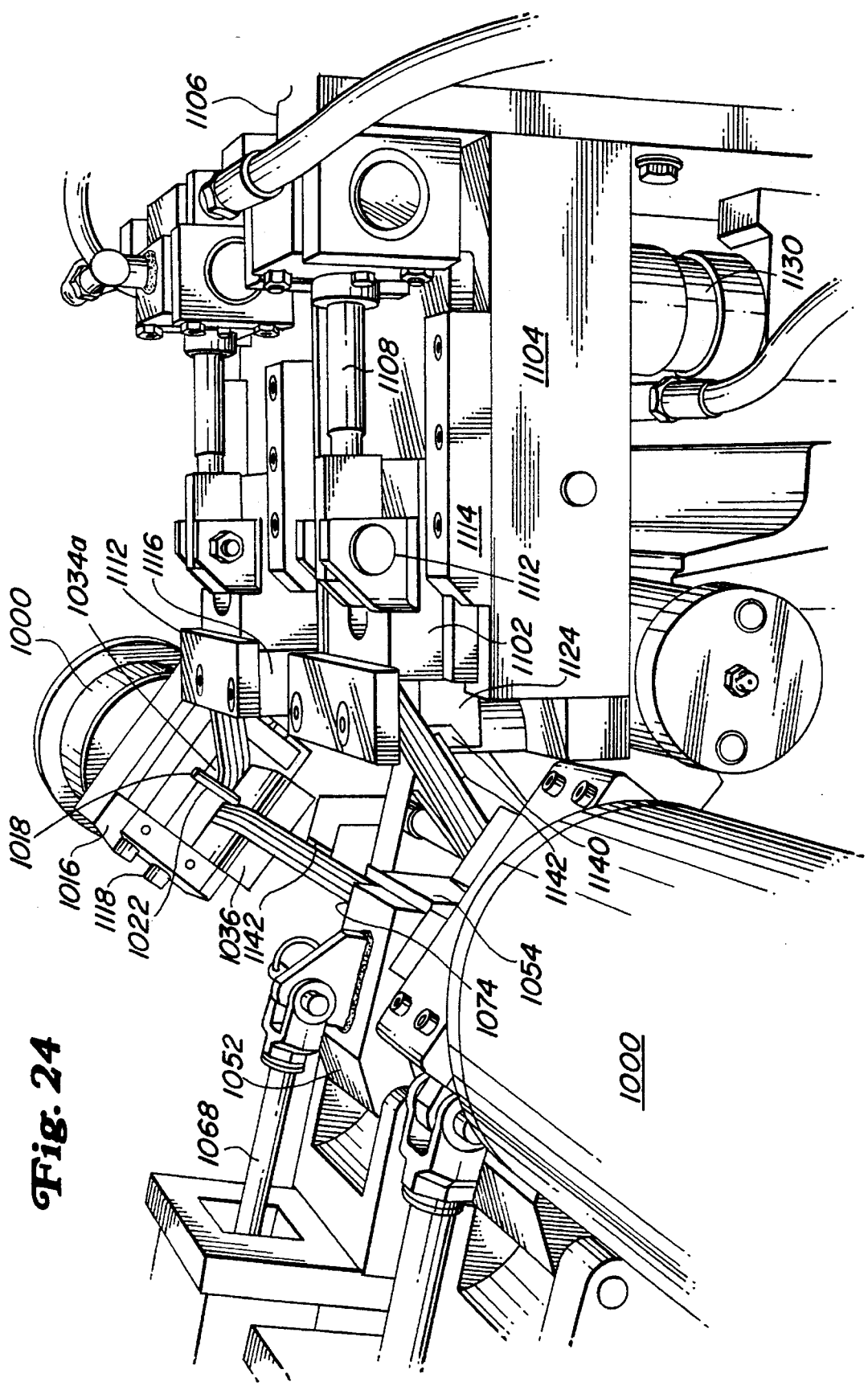
FIG. 24 is a partial perspective view of the apparatus of FIG. 23 illustrating a later stage in the coil forming process.

A pair of guides 1114 are disposed along the sides of the path of travel of the plunger 1102 to guide the plunger. The plunger 1102 is moved by the hydraulic cylinder 1106 from an open position as shown in FIG. 20 to a closed position as shown in FIG. 24.

Figure 21:
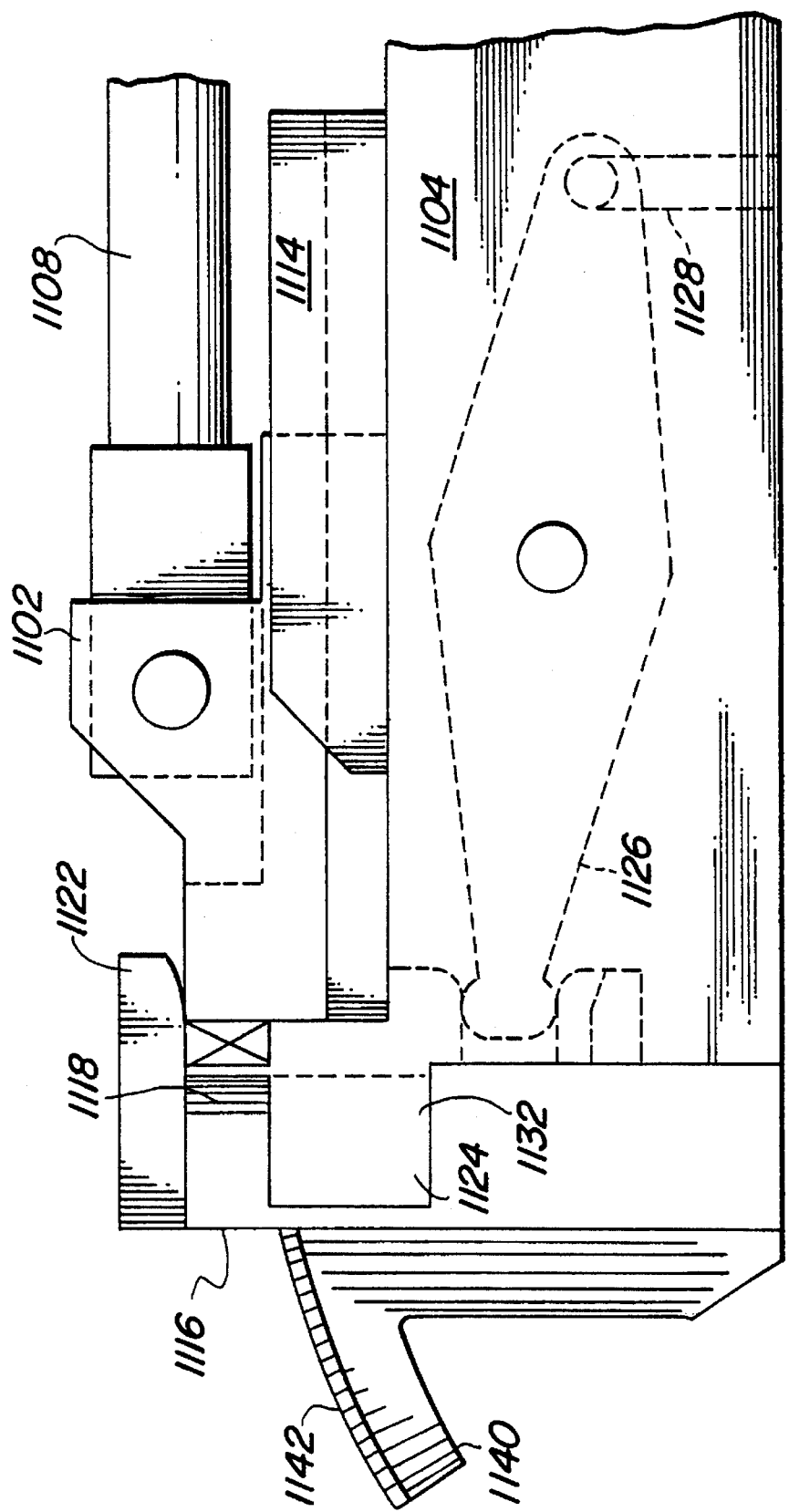
FIG. 21 is a side elevation of a lower leg clamp of the apparatus of FIG. 20.

Referring to FIGS. 20 and 21 in conjunction with FIG. 1, the lower leg clamps 1100 also include a rearward forming block 1116 which has a rounded outer forming side 1118 configured to form the radii 132, and 133 between the nose end arms 135, 137 and the lower straight end portion 110 of the bobbin 101. To pin and retain the bobbin 101 against the rearward forming block 1116 during the pulling operation, the lower leg clamp 1100 includes a horizontal positioning or upper flange 1122. The upper flange 1122 is attached to the top of and extends forward of the rearward block 1116 with sufficient clearance between the base 1104 and upper flange for passage of the plunger 1102.

The lower leg clamp 1100 also includes a vertically slidable lower locking block 1124. The locking block 1124 is vertically moved between a lower position, which allows insertion of the lower leg 102 of the bobbin 101 into the lower leg clamp 1100, to an upper position which positions and locks or pins the lower leg between the locking block 1124 and the upper flange 1122. A rocker arm 1126 engages the lower side of the clamping block 1124 to selectively vertically move the locking block between the upper and lower positions. The rocker arm 1126 is in turn operably engaged to a rod 1128 of a hydraulic cylinder 1130 (FIG. 24). The rocker arm 1126 translates reciprocal vertical movement on the rod 1128 to reciprocal vertical movement of the clamping block 1124.

The rearward surface of the clamping block 1124 is adapted to wrap about the forward surface 1116a and side wall 1118 of the rearward forming block 1116. The thickness of the portion of the clamping block 1124 which extends along the forward surface 1116a of the forming block 1116 is sized to form the proper spacing for the lower leg 102 of the bobbin 101 when the plunger 1102 is in the closed position.

An arc former 1140 for forming one of the arcs 139 of the bobbin 101 is attached to the lower leg clamp 1100. Referring to FIGS. 21 and 24, the arc former 1140 is attached to the outer and rearward side of the base 1104 and includes an upper forming surface 1142. The upper forming surface 1142 extends outward and downward from the forming side 1118 and is configured to engage the nose arms 135, 137 (FIG. 2) of the bobbin 101, and during the forming operation, forms the desired configuration of the arc 139.

Referring to FIGS. 22, 23 and 24 in conjunction with FIG. 2, a second set of arc formers 1154 are adapted to form the arcs 138, 139 of the nose arms 134, 136. The second set 1148 of arc formers includes a pair of elbow shaped rocker arms 1154 each of which are fixably mounted to the shaft 1152 which extends transverse through the coil forming apparatus 501 and is rotatably mounted to the base 502. The rocker arms 1154 extend from the shaft 1152 just outward of the corresponding upper leg clamps 1050. To rotate the shaft 1152, a second rocker arm 1156 is attached to the shaft. The second rocker arm 1156 is operably reciprocated, to selectively rotate the shaft 1152 through operative engagement to a rod (not shown) of a hydraulic cylinder (not shown). Rotational movement of the shaft 1152 also causing pivotal movement of the rockers 1154. Mounted to and extending upward from the forward 1154a end of the rocker arm 1154 is a tool 1160. The tool 1160 has an upper surface 1160a which engages one of the coil nose arms 134 and 136 when the shaft 1152 and elbow arms 1154 are rotated. The surface 1160a is configured to form the desired configuration of the arc 138. The tools 1160 may be detached from the elbow arm 1154 and replaced by other tools of different sizes and configurations to compensate for bobbins 101 (FIG. 1) of different sizes and shapes.

Figure 25:
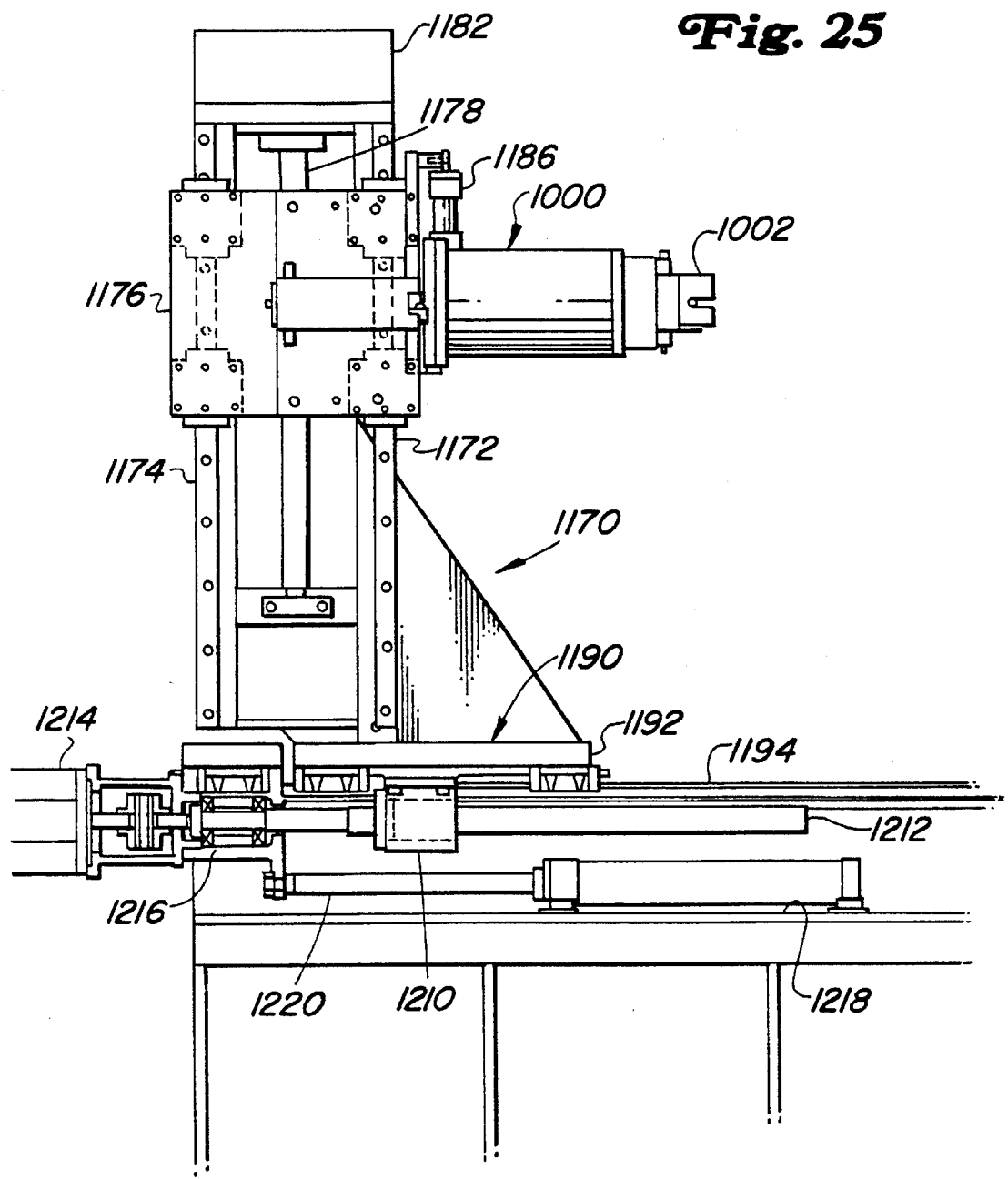
FIG. 25 is an alternate embodiment of a nose end clamping assembly positioning assembly forming a part of the apparatus of FIG. 19.

Referring to FIG. 25, an assembly for operably moving the nose clamp assembly 1000 is generally indicated at 1170. The assembly 1170 includes a tower frame 1172 having vertical tracks 1174 and a track riding unit 1176 adapted to ride along the tracks 1174. The nose clamp assembly 1000 is rotatably mounted to the track riding unit 1176. A screw drive mechanism 1178 extends within the tower 1172 and a servo motor and gear drive assembly 1182 rotates the screw drive 1178. A threaded coupling (not shown) of the riding unit 1176 engages the screw drive 1178 so that rotation of the screw drive vertically moves the track riding unit 1176 and nose clamp assembly 1000. The apparatus 1170 also includes a hydraulic cylinder 1186 having the cylinder end attached to the tower frame 1172 and the rod end engaged with the nose clamp assembly 1000 so that reciprocal movement of the rod causes a selective rotational movement of the nose clamp assembly 1000.

To move the tower frame 1172 transversely along the base 502, a tower is mounted to a transverse drive 1190. The transverse 1190 includes a horizontal track riding unit 1192 which is mounted on tracks 1194 with guides 1196, preferably ball bearing guides such as THK LM™ guides or the like.

The track riding unit 1192 is attached to a threaded coupling 1210 which engages a screw drive shaft 1212 so that rotation of this drive shaft causes lateral movement of the track riding unit 1192. The drive shaft 1212 is operably connected to a servo motor 1214 which is mounted to a base 1216 which also rides along track 1194.

The positioning assembly 1170 also includes an air cylinder 1218 having a rod end 1220 which is connected to the frame 1216. The air cylinder 1218 may be operated to reciprocally move the rod end 1220 and coarsely position the frame 1216 and track riding unit 1176. Then servo motor 1214 is operated to rotate the screw drive shaft 1212 to selectively position the track riding unit 1176. Referring also to FIG. 1, during the forming operation of the bobbin 101, as legs 103,102 are spread apart, the nose ends 106, 107 are pulled inward toward each other. The inward pulling force applied by the nose ends on the nose clamps 1000 is translated to the positioning assembly 1170 and the air cylinder 1218 is configured to provide an outwardly resistance force against this pulling force.

Referring to FIGS. 20 and 23 in conjunction with FIG. 1, in operation, the lower support frames 540 and tower frames 510 are positioned so that the upper leg clamps 1050 are in their open position generally and vertically disposed over the lower leg clamps 1100, as shown in FIG. 20. The lower support frames 540 and tower frames 510 are also positioned so that the bobbin 101 may be positioned in the upper clamps 1050 and lower clamps 1100 with the straight length portion 115 of the upper leg 103 extending over the lower flange 1054 of the upper clamps 1050 and the straight length portion 110 of the lower leg 102 extending below the upper flanges 1122 of the lower leg clamps 1100, as shown in FIG. 21. Each of the nose clamp assemblies 1000 are then positioned by their respective positioning assemblies 1170 and the forward jaws 1012 are placed in the closed position to engage the nose ends 106, 107 of the bobbin 101, as shown in FIG. 24.

As shown in FIG. 22, the actuating assembly 1062 then rotates the upper forming flange 1052 from the open position to the closed position thereby pinning the upper straight length portion 115 between the upper flange 1052 and frame 752. The rearward actuating assembly 1088 then moves the intermediate locking flange 1052 downward to pin the straight length portion 115 between the intermediate locking flange 1056 and lower flange 1054.

The lower leg clamps 1100 are then moved from the open position to the closed position through actuation of hydraulic cylinders 1106 to move plunger block 1102 inward to pin the lower straight length portion 110 between the plunger block and rearward forming block 1116. The clamping block 1124 is then moved upward, through downward movement of rod 1128, to pin the lower straight length portion 115 between the forming block 1124 and the upper flange 1122.

Figure 5C:
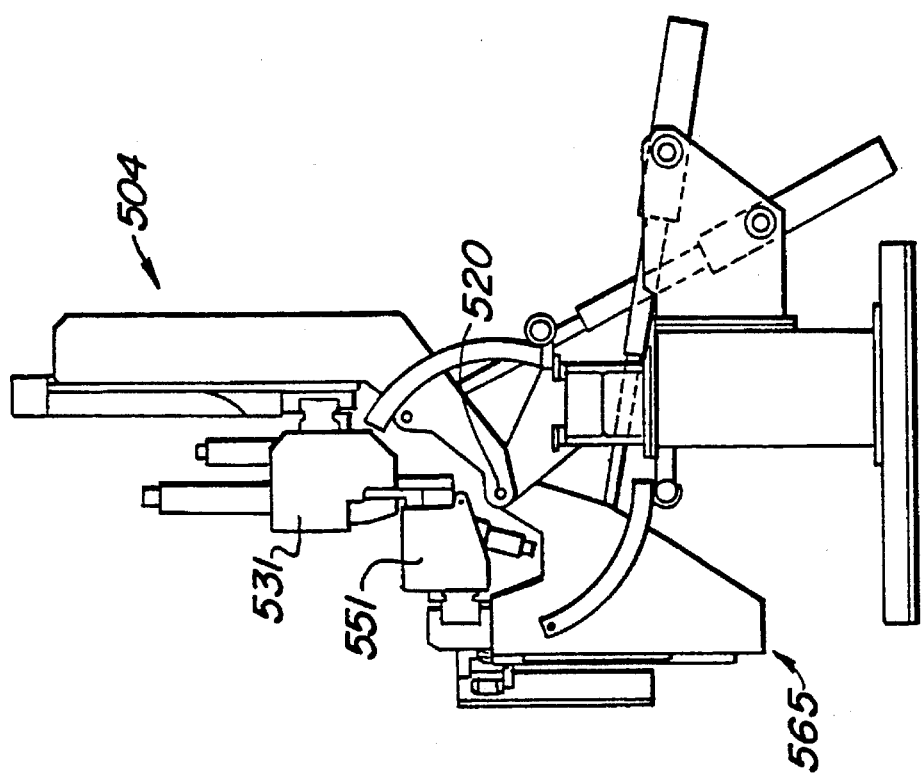
FIG. 5C is a side view through line A—A of FIG. 5A.
Figure 5B:
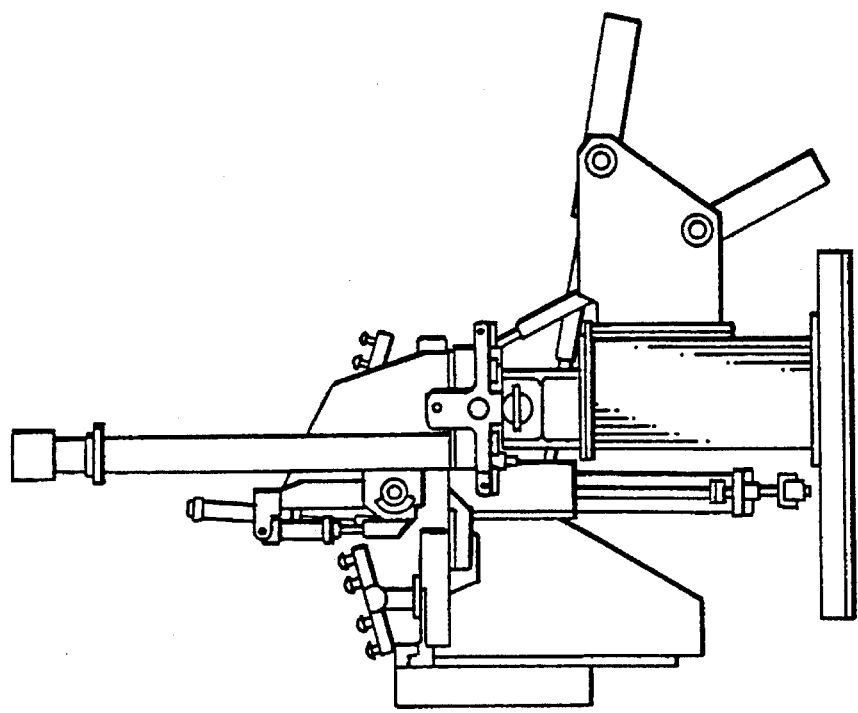
FIG. 5B is a side view of some of the components of the apparatus in FIG. 5A through line F—F.

As shown in FIG. 23, the tower frame 510 and support frame 540 are pivoted about pivot 520 (FIG. 5c). Pivot point 520 is located at the same radial distance from the bobbin legs 102, 103 in the clamps as the distance from the slots in the stator core in which the coil will be placed is from the center bore of the stator core. Thus, the legs of the coil are positioned by the apparatus so as to fit exactly in the stator core. As noted above, the tower frame 510 and support frame 540 may be pivoted by pivot 520 by hydraulic drive means or other suitable means which may include hydraulic cylinders (not shown) actuated through the selection addition of hydraulic fluid by meter pumps (not shown) or driven by servo motors (not shown). Position encoding means, not shown but known to those skilled in the art, may be employed to operably determine the angles through which a tower frame and lower frame have been pivoted.

Also referring to FIG. 2, as the tower frame 510 and support frame 540 are pivoted about pivot 520, the upper leg 103 is separated from the lower leg 102. During the separation, the rounded surfaces of the outer sides 1074 of the upper flanges 1052 contact the bobbin 101 adjacent the straight length portion 115 to form radii 130, 131 respectively.

Also, during separation, the side forming walls 1118 (FIG. 22) of the lower leg clamps 1100 engage the bobbin adjacent the lower straight length portion 110 to form radii 132, 133. The outer side 1036 of rearward jaw 1008 and outer side 1034 of forward jaw 1012 of the nose clamps 1000 form the radii 146, 147 adjacent nose 106 and radii 148, 149 adjacent nose 107. As the upper leg 103 is separated from the lower leg 102, the upper surface 1142 (FIG. 21) of the arc formers 1140 engage the nose end arms 135, 137 to form the arc 139.

When the tower frame 510 and lower support frame 540 are pivoted so that the lower leg 102 and upper leg 103 of the bobbin 101 are separated by the desired spacing, the pivotal movement is halted. The shaft 1152 is then rotated so that the upper arc forming surface 1160a of the rocker 1154 are rotated upward to engage the bobbin 101 to form the arcs 138. To orient the lead end nose 106 and opposite lead end nose 107 to the desired orientation, the hydraulic cylinders 1186 are actuated to rotate the nose end clamping assemblies 1000 and forward jaws 1012 about an axis parallel to the axis through pivot 520 (FIG. 5).

To remove the finished bobbin 101 from the coil forming apparatus 501, the upper leg clamp 1050 and lower leg clamps 1100 are placed in their opened positions. The shaft 1152 is rotated to rotate the rocker 1154 out of engagement with the bobbin 101. Referring to FIG. 18, the T-shaped plunger 1028 is retracted and the biasing element of the pins 1014 force the nose clamps 1000 into the open position and the bobbin is then removed.

A specific embodiment of the novel Improved AC Coil Former according to the present invention has been described for the purposes of illustrating the manner in which the invention may be made and used. It should be understood that implementation of other variations and modifications of the invention in its carious aspects will be apparent to those skilled in the art, and that the invention is not limited by the specific embodiment described. It is therefore contemplated to cover by the present invention any and all modifications, variations, or equivalents that fall within the true spirit and scope of the basic underlying principles disclosed and claimed herein.

We claim:

1. An apparatus for forming a form wound stator coil from a bobbin having a lower leg including a straight length arm and two outer nose end arms, and an upper leg including an upper leg straight length portion and two outer nose end arms, an outer lead end nose attached to one of the nose end arms of the upper length portion and lower length portion, the lead end nose and attached nose end arms defining a lead end inner nose radius, an outer opposite lead end nose attached to the other of the nose end arms of the upper length portion and lower length portion, the opposite lead end nose end attached nose end arms defining an opposite lead end inner nose radius, the apparatus comprising;

- a. lower leg clamping means attached to a drive frame for clamping the lower leg of the bobbin to maintain the lower leg straight length portion substantially in its original shape and for forming a radius of predetermined dimensions between the straight length portion and the lower leg nose end arms;
- b. lower leg clamp positioning means operably engaged to the lower leg clamping means for initially positioning the lower leg clamping means on at least the opposite ends of the lower leg straight length portion;
- c. upper leg clamping means attached to a support frame for clamping the Upper leg of the bobbin to maintain the upper leg straight length portion substantially in its original shape and for forming a radius of predetermined dimensions between the straight length portion and the upper leg nose end arms, the support frame being pivotally attached to the drive frame, said upper leg clamping means including an upper forming flange hingeably attached to the support frame, a lower forming flange fixedly attached to the support frame below the upper forming flange and a locking flange means slidably attached to the support frame for fixedly holding the upper leg of the bobbin between the locking flange and the lower forming flange, the upper forming flange having an outer forming race, the lower forming flange having an outer forming portion, the forming face of the upper flange being disposed adjacent the forming portion of the lower flange when the upper forming flange is rotated to a closed position, the forming face of the upper flange and the forming portion of the lower flange being configured to form a desired radius between the straight portion of the upper leg and one of the nose end arms when the support frame and drive frame are pivoted;
- d. upper leg clamp positioning means operably attached to the upper leg clamping means for initially positioning the upper leg clamping means on at least the opposite ends of the upper leg straight length portion;
- e. pivoting means for pivoting the drive frame relative to the support frame about an axis equivalent to the center axis of the stator core into which the finished coil will be inserted;
- f. nose end clamping means for securing the nose end of the bobbin, for forming a radii, proximate to the nose end, between the nose end and the nose end arms attached to the nose end, and for rotating the nose end to a predetermined angle relative to the attached nose arms;
- g. positioning means operable attached to the nose end clamping means for positioning the nose end clamping means with respect to the dimensions of the bobbin; and
- h. arc forming means fixedly attached to the lower leg clamping means for engaging the nose and arms of the lower leg of the bobbin during the pivoting of the drive frame relative to the support frame, the arc forming means including an upper surface adjacent and extending outward from the lower leg clamping means.

2. An apparatus for forming a form wound stator coil from a bobbin having a lower leg including a straight length arm and two outer nose end arms, and an upper leg including an upper leg straight length portion and two outer nose end arms, an outer lead end nose attached to one of the nose end arms of the upper length portion and lower length portion, the lead end nose and attached nose end arms defining a lead end inner nose radius, an outer opposite lead end nose attached to the other of the nose end arms of the upper length portion and lower length portion, the opposite lead end nose end attached nose end arms defining an opposite lead end inner nose radius, the apparatus comprising:

- a. lower leg clamping means attached to a drive frame for clamping the lower leg of the bobbin to maintain the lower leg straight length portion substantially in its original shape and for forming a radius of predetermined dimensions between the straight length portion and the lower leg nose end arms, the lower leg clamping means including a rearward flange and a plunger means slidably disposed on the drive frame for selectively pinning the lower leg of the bobbin between the plunger and the rearward flange, the rearward flange also including and outer face configured to form a desired radius between the straight portion of the lower leg and one of the nose end arms when the support frame are pivoted;
- b. lower leg clamp positioning means operably engaged to the lower leg clamping means for initially positioning the lower leg clamping means on at least the opposite ends of the lower leg straight length portion;
- c. upper leg clamping means attached to a support frame for clamping the upper leg of the bobbin to maintain the upper leg straight length portion substantially in its original shape and for forming a radius of predetermined dimensions between the straight length portion and the upper leg nose end arms, the support frame being pivotally attached to the drive frame;
- d. upper leg clamp positioning means operably attached to the upper leg clamping means for initially positioning the upper leg clamping means on at least the opposite ends of the upper leg straight length portion;
- e. pivoting means for pivoting the drive frame relative to the support frame about an axis equivalent to the center axis of the stator core into which the finished coil will be inserted;
- f. nose end clamping means for securing the nose end of the bobbin, for forming a radii, proximate to the nose end, between the nose end and the nose end arms attached to the nose end, and for rotating the nose end to a predetermined angle relative to the attached nose arms;
- g. positioning means operable attached to the nose end clamping means for positioning the nose end clamping means with respect to the dimensions of the bobbin; and
- h. arc forming means fixedly attached to the lower leg clamping means for engaging the nose and arms of the lower leg of the bobbin during the pivoting of the drive frame relative to the support frame, the arc forming means including an upper surface adjacent and extending outward from the lower leg clamping means.

3. The apparatus of claim 2 wherein the lower clamping means includes an upper flange attached to the rearward flange and extending forward of the rearward flange and a locking flange slidably disposed along at least a portion of a front face of the rearward flange.

4. An apparatus for forming a form wound stator coil from a bobbin having a lower leg including a straight length arm and two outer nose end arms, and an upper leg including an upper leg straight length portion and two outer nose end arms, an outer lead end nose attached to one of the nose end arms of the upper length portion and lower length portion, the lead end nose and attached nose end arms defining a lead end inner nose radius, an outer opposite lead end nose attached to the other of the nose end arms of the upper length portion and lower length portion, the opposite lead end nose end attached nose end arms defining an opposite lead end inner nose radius, the apparatus comprising:

a. lower leg clamping means attached to a drive frame for clamping the lower leg of the bobbin to maintain the lower leg straight length portion substantially in its original shape and for forming a radius of predetermined dimensions between the straight length portion and the lower leg nose end arms;

b. lower leg clamp positioning means operably engaged to the lower leg clamping means for initially positioning the lower leg clamping means on at least the opposite ends of the lower leg straight length portion;

c. upper leg clamping means attached to a support frame for clamping the upper leg of the bobbin to maintain the upper leg straight length portion substantially in its original shape and for forming a radius of predetermined dimensions between the straight length portion and the upper leg nose end arms, the support frame being pivotally attached to the drive frame;

d. upper leg clamp positioning means operably attached to the upper leg clamping means for initially positioning the upper leg clamping means on at least the opposite ends of the upper straight length portion;

e. pivoting means for pivoting the drive frame relative to the support frame about an axis equivalent to the center axis of the stator core into which the finished coil will be inserted;

f. nose end clamping means for securing the nose end of the bobbin, for forming a radii, proximate to the nose end, between the nose end and the nose end arms attached to the nose end, and for rotating the nose end to a predetermined angle relative to the attached nose arms, the nose end clamping means including a rearward flange and a forward flange hingeably attached to a frame and rotatable between an open position and a closed position wherein the inner faces of the forward flange and rearward flange are directly opposite each other and clasping the nose end of the bobbin, one of the forward and rearward flanges having a pin extending generally outward from the forward face and the other of the forward flange and rearward flange forming a slot for receiving the pin when the forward flange and rearward flange are in the closed position;

g. positioning means operable attached to the nose end clamping means for positioning the nose end clamping means with respect to the dimensions of the bobbin; and h. arc forming means fixedly attached to the lower leg clamping means for engaging the nose and arms of the lower leg of the bobbin during the pivoting of the drive frame relative to the support frame, the arc forming means including an upper surface adjacent and extending outward from the lower leg clamping means.

5. The apparatus of claim 4 wherein the nose end clamping means includes means for selectively moving the rearward flange and the forward flange between the open and closed position.

6. An apparatus for forming a form wound stator coil from a bobbin having a lower leg including a straight length arm and two outer nose end arms, and an upper leg including an upper leg straight length portion and two outer nose end arms, an outer lead end nose attached to one of the nose end arms of the upper length portion and lower length portion, the lead end nose and attached nose end arms defining a lead end inner nose radius, an outer opposite lead end nose attached to the other of the nose end arms of the upper length portion and lower length portion, the opposite lead end nose and attached nose end arms defining an opposite lead end inner nose radius, the apparatus comprising:

a. lower leg clamping means attached to a drive frame for clamping the lower leg of the bobbin to maintain the lower leg straight length portion substantially in its original shape and for forming a radius of predetermined dimensions between the straight length portion and the lower leg nose end arms, the lower leg clamping means includes rearward flange and a plunger means slidably disposed on the drive frame for selectively pinning the lower leg of the bobbin between the plunger and the rearward flange, the rearward flange also including an outer face configured to form a desired radius between the straight portion of the lower leg and one of the nose end arms when the support frame and drive frame are pivoted, said upper clamping means includes an upper forming flange hingeably attached to the support frame, a lower forming flange fixedly attached to the support frame below the upper forming flange and a locking flange means slidably attached to the support frame for fixedly holding the upper leg of the bobbin between the locking flange and the lower forming flange, the upper forming flange having an outer forming face, the lower forming flange having an outer forming portion, the forming face of the upper flange being disposed adjacent the forming portion of the lower flange when the upper forming flange is rotated to a closed position, the forming face of the upper flange and the forming portion of the lower flange being configured to form a desired radius between the straight portion of the upper leg and one of the nose end arms when the support frame and drive frame are pivoted;

b. lower leg clamp positioning means operably engaged to the lower leg clamping means for initially positioning the lower leg clamping means on at least the opposite ends of the lower leg straight length portion;

c. upper leg clamping means attached to a support frame for clamping the upper leg of the bobbin to maintain the upper leg straight length portion substantially in its original shape and for forming a radius of predetermined dimensions between the straight length portion and the upper leg nose end arms, the support frame being pivotally attached to the drive frame, said upper clamping means includes an upper forming flange hingeably attached to the support frame, a lower forming flange fixedly attached to the support frame below the upper forming flange and a locking flange means slidably attached to the support frame for fixedly holding the upper leg of the bobbin between the locking flange and the lower forming flange, the upper forming flange having an outer forming face, the lower forming flange having an outer forming portion, the forming face of the upper flange being disposed adjacent the forming portion of the lower flange when the upper forming flange is rotated to a closed position, the forming face of the upper flange and the forming portion of the lower flange being configured to form a desired radius between the straight portion of the upper leg and one of the nose end arms when the support frame and drive frame are pivoted;

d. upper leg clamp positioning means operably attached to the upper leg clamping means for initially positioning the upper leg clamping means on at least the opposite ends of the upper leg straight length portion;

e. pivoting means for pivoting the drive frame relative to the support frame about an axis equivalent to the center axis of the stator core into which the finished coil will be inserted;

f. nose end clamping means slidably disposed along for securing the nose end of the bobbin, for forming a radii, proximate to the nose end, between the nose end and the nose end arms attached to the nose end, and for rotating the nose end to a predetermined angle relative to the attached nose arms, the nose end clamping means includes a rearward flange and a forward flange hingeably attached to a frame and rotatable between an open position and a closed position wherein the inner faces of the forward flange and rearward flange are directly opposing each other and clasping the nose end of the bobbin, one of the forward and rearward flanges having a pin extending generally outward from the forward face and the other of the forward flange and rearward flange forming a slot for receiving the pin when the forward flange and rearward flange are in the closed position;

g. positioning means operably attached to the nose end clamping means for positioning the nose end clamping means with respect to the dimensions of the bobbin; and h. arc forming means fixedly attached to the lower leg clamping means for engaging the nose end arms of the lower leg of the bobbin during the pivoting of the drive frame relative to the support frame, the arc forming means including an upper surface adjacent and extending outward from the lower leg clamping means.

\* \* \* \* \*